United States Patent
Li et al.

(10) Patent No.: US 11,178,663 B2
(45) Date of Patent: Nov. 16, 2021

(54) DATA TRANSMISSION METHOD AND DEVICE

(71) Applicant: HUAWEI TECHNOLOGIES CO., LTD., Guangdong (CN)

(72) Inventors: Bingzhao Li, Beijing (CN); Hong Wang, Beijing (CN); Li Chen, Shenzhen (CN); Wei Quan, Beijing (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/271,479

(22) Filed: Feb. 8, 2019

(65) Prior Publication Data

US 2019/0174502 A1    Jun. 6, 2019

Related U.S. Application Data

(63) Continuation of application No. PCT/CN2016/095032, filed on Aug. 12, 2016.

(51) Int. Cl.
*H04W 72/04* (2009.01)
*H04L 1/18* (2006.01)
(Continued)

(52) U.S. Cl.
CPC .......... *H04W 72/0453* (2013.01); *H04L 1/08* (2013.01); *H04L 1/189* (2013.01); *H04W 4/06* (2013.01);
(Continued)

(58) Field of Classification Search
CPC ................................................ H04W 72/0453
See application file for complete search history.

(56) References Cited

U.S. PATENT DOCUMENTS

| | | | | |
|---|---|---|---|---|
| 8,451,769 B2 * | 5/2013 | Lee | ............... | H04B 7/155 370/315 |
| 8,467,329 B2 * | 6/2013 | Lee | ............... | H04W 48/12 370/312 |

(Continued)

FOREIGN PATENT DOCUMENTS

| | | |
|---|---|---|
| CN | 101252776 A | 8/2008 |
| CN | 101444012 A | 5/2009 |

(Continued)

OTHER PUBLICATIONS

Alcatel-Lucent:"Discussion on Idle mode UE handling of SC-PTM", 3GPP TSG RAN WG2 Meeting #90, R2-152532, Fukuoka, Japan, May 25-29, 2015. total 4 pages.XP050972918.
(Continued)

*Primary Examiner* — Parth Patel
(74) *Attorney, Agent, or Firm* — Gregg L. Jansen

(57) ABSTRACT

Embodiments of the present invention relate to the communications field, and disclose a data transmission method and device to resolve a problem that a success rate of receiving data by an MTC terminal is relatively low after an SC-PTM technology is introduced. A specific solution is as follows: A base station device sends first control information to a terminal device, where the first control information is used to control repeated transmission of multicast service data; and the base station device sends the multicast service data to the terminal device according to the first control information. The present invention is used in a data transmission process.

18 Claims, 13 Drawing Sheets

(51) Int. Cl.
*H04L 1/08* (2006.01)
*H04W 4/70* (2018.01)
*H04W 4/06* (2009.01)
*H04L 1/00* (2006.01)

(52) U.S. Cl.
CPC ........... *H04W 4/70* (2018.02); *H04W 72/042* (2013.01); *H04L 2001/0093* (2013.01)

(56) References Cited

U.S. PATENT DOCUMENTS

| | | | | |
|---|---|---|---|---|
| 8,989,204 | B2* | 3/2015 | Wang | H04W 72/005 370/431 |
| 9,344,857 | B1* | 5/2016 | Kazeminejad | H04W 48/12 |
| 9,794,042 | B2* | 10/2017 | Horiuchi | H04L 1/1887 |
| 9,913,184 | B2* | 3/2018 | Jung | H04W 36/08 |
| 10,159,090 | B2* | 12/2018 | You | H04B 7/2656 |
| 10,165,602 | B2* | 12/2018 | Yang | H04W 74/08 |
| 10,263,747 | B2* | 4/2019 | You | H04L 5/00 |
| 10,623,931 | B2* | 4/2020 | Park | H04L 1/08 |
| 2007/0162810 | A1* | 7/2007 | Sato | H04L 1/1678 714/748 |
| 2007/0195813 | A1* | 8/2007 | Lin | H04W 74/0833 370/448 |
| 2009/0274085 | A1* | 11/2009 | Wang | H04W 72/005 370/312 |
| 2010/0165901 | A1* | 7/2010 | Kim | H04W 72/005 370/312 |
| 2010/0278093 | A1* | 11/2010 | Wang | H04L 1/0025 370/312 |
| 2013/0250843 | A1* | 9/2013 | Zhou | H04L 1/0015 370/312 |
| 2013/0301515 | A1* | 11/2013 | Kim | H04L 1/1864 370/312 |
| 2014/0177547 | A1* | 6/2014 | Guo | H04W 72/042 370/329 |
| 2014/0177587 | A1* | 6/2014 | Lee | H04W 72/005 370/330 |
| 2015/0181576 | A1* | 6/2015 | Papasakellariou | H04L 1/08 370/329 |
| 2015/0305041 | A1 | 10/2015 | Kim | |
| 2016/0073408 | A1* | 3/2016 | Sartori | H04W 72/0453 370/329 |
| 2016/0192171 | A1* | 6/2016 | Takano | H04W 76/14 370/329 |
| 2016/0241412 | A1* | 8/2016 | Panchal | H04L 12/189 |
| 2016/0242212 | A1* | 8/2016 | Wong | H04W 4/70 |
| 2016/0278052 | A1* | 9/2016 | Kim | H04W 4/70 |
| 2016/0345118 | A1* | 11/2016 | Oh | H04W 4/70 |
| 2016/0381666 | A1* | 12/2016 | Kim | H04L 5/0055 370/329 |
| 2017/0006583 | A1* | 1/2017 | Tavildar | H04B 7/2615 |
| 2017/0013615 | A1* | 1/2017 | Suzuki | H04W 72/042 |
| 2017/0195946 | A1* | 7/2017 | Jung | H04W 52/02 |
| 2017/0238301 | A1* | 8/2017 | Nakazawa | H04J 11/00 370/329 |
| 2017/0265168 | A1* | 9/2017 | Wang | H04L 67/12 |
| 2017/0265217 | A1* | 9/2017 | Lomayev | H04L 5/005 |
| 2017/0290016 | A1* | 10/2017 | Yi | H04W 48/12 |
| 2017/0325198 | A1* | 11/2017 | Adachi | H04W 72/04 |
| 2017/0346607 | A1* | 11/2017 | Chen | H04W 72/14 |
| 2017/0347350 | A1* | 11/2017 | Takeda | H04W 72/04 |
| 2018/0049060 | A1* | 2/2018 | Fujishiro | H04W 28/06 |
| 2018/0062904 | A1* | 3/2018 | Hwang | H04L 27/2614 |
| 2018/0139720 | A1* | 5/2018 | Chen | H04W 72/1289 |
| 2018/0184348 | A1* | 6/2018 | Uemura | H04W 72/0453 |
| 2018/0213433 | A1* | 7/2018 | Sugaya | H04L 1/1685 |
| 2018/0227973 | A1* | 8/2018 | Tsuboi | H04W 76/14 |
| 2018/0309544 | A1* | 10/2018 | Hwang | H04L 1/1887 |
| 2018/0317098 | A1* | 11/2018 | Choi | H04L 25/023 |
| 2018/0376375 | A1* | 12/2018 | Turtinen | H04N 21/47202 |
| 2019/0013902 | A1* | 1/2019 | Seo | H04L 1/00 |
| 2019/0013985 | A1* | 1/2019 | Takeda | H04W 72/04 |
| 2019/0028245 | A1* | 1/2019 | Gao | H04W 72/0453 |
| 2019/0104541 | A1* | 4/2019 | Lee | H04W 76/11 |
| 2019/0174479 | A1* | 6/2019 | Yamazaki | H04L 5/0057 |
| 2019/0174502 | A1* | 6/2019 | Li | H04W 72/042 |
| 2019/0208499 | A1* | 7/2019 | Gupta | H04W 68/02 |

FOREIGN PATENT DOCUMENTS

| | | |
|---|---|---|
| CN | 101873528 A | 10/2010 |
| CN | 102625256 A | 8/2012 |
| CN | 105451164 A | 3/2016 |
| CN | 105812092 A | 7/2016 |
| WO | 2015060639 A1 | 4/2015 |
| WO | 2016121859 A1 | 8/2016 |
| WO | 2017213795 A1 | 12/2017 |

OTHER PUBLICATIONS

3GPP TS 36.212 V13.2.0 (Jun. 2016);3rd Generation Partnership Project;Technical Specification Group Radio Access Network;Evolved Universal Terrestrial Radio Access (E-UTRA);Multiplexing and channel coding(Release 13),total 140 pages.

3GPP TS 36.331 V13.2.0 (Jun. 2016);3rd Generation Partnership Project;Technical Specification Group Radio Access Network;Evolved Universal Terrestrial Radio Access (E-UTRA); Radio Resource Control (RRC);Protocol specification (Release 13),total 623 pages.

3GPP TS 36.213 V13.2.0 (Jun. 2016);3rd Generation Partnership Project;Technical Specification Group Radio Access Network;Evolved Universal Terrestrial Radio Access (E-UTRA); Physical layer procedures(Release 13),total 381 pages.

3GPP TSG-RAN WG2 #92 R2-157180,ZTE Corporation,"Introduction of SC-PTM in MAC",Nov. 27, 2015,total 66 pages.

* cited by examiner

A second repetition quantity is 1

A second repetition quantity is 2

A second repetition quantity is 3

A second repetition pattern is transmitting a change notification once every subframe A second repetition pattern is transmitting a change notification once every two subframes A second repetition pattern is transmitting a change notification once every three subframes A repetition interval is 0 subframe
(a corresponding repetition period is one subframe)

A repetition interval is one subframe
(a corresponding repetition period is two subframes)

A repetition interval is two subframes
(a corresponding repetition period is three subframes)

A repetition time is two subframes

A repetition time is three subframes

A repetition time is four subframes

DATA TRANSMISSION METHOD AND DEVICE

CROSS-REFERENCE TO RELATED APPLICATIONS

This application is a continuation of International Application No. PCT/CN2016/095032, filed on Aug. 12, 2016, the disclosure of which is hereby incorporated by reference in its entirety.

TECHNICAL FIELD

The present invention relates to the communications field, and in particular, to a data transmission method and device.

BACKGROUND

Machine type communication (MTC) is machine to machine (M2M) communication in which data transmission is performed by using a cellular network. MTC is mainly applied to fields such as intelligent traffic, smart grid, and smart household. In these fields, most MTC terminals are deployed in limited closed space, for example, a special communication environment such as a vehicle or a basement. In comparison with a common communication environment, a signal received by an MTC terminal is subject to an additional 20 dB penetration loss. In other words, communication quality in this environment is not good, and a success rate of receiving data by the MTC terminal is relatively low. Currently, a coverage enhancement technology may be introduced to increase the success rate of receiving data by the MTC terminal.

In addition, the conventional MTC supports only a unicast communication mode. To be specific, each MTC terminal needs to separately establish a communications link with a base station, to receive data from the base station. In the unicast communication mode, when the base station needs to deliver multicast service data of a group type such as software upgrade to all MTC terminals in a group, the base station needs to send, by using a communications link separately established with each MTC terminal, the multicast service data to the corresponding MTC terminal. Consequently, resource consumption of the base station is relatively heavy, and network load is also increased. Especially when a quantity of MTC terminals included in the group is relatively large, the foregoing problem is more obvious. To reduce resource consumption of the base station and mitigate network load, a single cell point to multi-point (SC-PTM) communications technology may be introduced in the MTC. In this technology, a group of MTC terminals receiving a same piece of multicast service data may use a same downlink configuration to receive the data. In other words, the group of MTC terminals may establish only one shared communications link with the base station. In this way, when the base station needs to deliver multicast service data, the base station may send the multicast service data to all MTC terminals in the group by using the shared communications link. Therefore, resource consumption of the base station is reduced, and network load is also mitigated. However, the SC-PTM technology does not support the coverage enhancement technology currently, that is, after the SC-PTM technology is introduced, the success rate of receiving data by the MTC terminal is still relatively low.

Therefore, how to increase the success rate of receiving data by the MTC terminal after the SC-PTM technology is introduced has become an important research topic for a person skilled in the art.

SUMMARY

Embodiments of the present invention provide a data transmission method and device to resolve a problem that a success rate of receiving data by an MTC terminal is relatively low after an SC-PTM technology is introduced.

To achieve the foregoing objective, the present invention uses the following technical solutions:

According to a first aspect, an embodiment of the present invention provides a data transmission method, including: sending, by a base station device to a terminal device, first control information used to control repeated transmission of multicast service data; and sending the multicast service data to the terminal device according to the first control information.

The base station device may be specifically an access network device such as a base station. The terminal device may be specifically an MTC terminal, and the MTC terminal is a terminal using an MTC technology.

In the data transmission method provided by the present invention, the base station device sends, to the terminal device, the first control information used to control repeated transmission of the multicast service data, and repeatedly sends the multicast service data to the terminal device according to the first control information, so that the terminal device can receive, according to the received first control information, the multicast service data repeatedly sent by the base station device. Therefore, a success rate of receiving the multicast service data by the terminal device is increased. Therefore, in MTC in which an SC-PTM technology is introduced, an MTC terminal can receive, according to received first control information, multicast service data repeatedly sent by a base station, and a success rate of receiving data by the MTC terminal is increased.

With reference to the first aspect, in a possible implementation, to further increase the success rate of receiving the multicast service data by the terminal device, the first control information used to control repeated transmission of the multicast service data may also be transmitted repeatedly. Therefore, before the sending, by a base station device, first control information to a terminal device, the data transmission method may further include: sending, by the base station device to the terminal device, system information used to control repeated transmission of the first control information. In this case, correspondingly, the sending, by a base station device, first control information to a terminal device may specifically include: sending, by the base station device, the first control information to the terminal device according to the system information.

With reference to the first aspect or the foregoing possible implementation, in another possible implementation, to further increase the success rate of receiving the multicast service data by the terminal device, the first control information used to control repeated transmission of the multicast service data may also be transmitted repeatedly. Therefore, before the sending, by a base station device, first control information to a terminal device, the data transmission method may further include: sending, by the base station device to the terminal device, second control information used to control repeated transmission of the first control information. In this case, correspondingly, the sending, by a base station device, first control information to a terminal device may specifically include: sending, by the base station device, the first control information to the terminal device according to the second control information.

With reference to the first aspect and the foregoing possible implementation, in another possible implementation, to further increase the success rate of receiving the multicast service data by the terminal device, the second control information used to control repeated transmission of the first control information may also be transmitted repeatedly. Therefore, before the sending, by the base station device, second control information to the terminal device, the data transmission method may further include: sending, by the base station device to the terminal device, system information used to control repeated transmission of the second control information. In this case, correspondingly, the sending, by the base station device, second control information to the terminal device may specifically include: sending, by the base station device, the second control information to the terminal device according to the system information. Alternatively, in the solution to repeated transmission of the first control information, some parameters used to control repeated transmission of the first control information may be included in system information. Therefore, before the sending, by the base station device, second control information to the terminal device, the data transmission method may further include: sending, by the base station device to the terminal device, system information used to control repeated transmission of the first control information. In this case, correspondingly, the sending, by a base station device, first control information to a terminal device may specifically include: sending, by the base station device, the first control information to the terminal device according to the system information. Alternatively, to further increase the success rate of receiving the multicast service data by the terminal device, the second control information used to control repeated transmission of the first control information may also be transmitted repeatedly. In addition, in the solution to repeated transmission of the first control information, some parameters used to control repeated transmission of the first control information may be included in system information. Therefore, before the sending, by the base station device, second control information to the terminal device, the data transmission method may further include: sending, by the base station device to the terminal device, system information used to control repeated transmission of the second control information and used to control repeated transmission of the first control information. In this case, correspondingly, the sending, by the base station device, second control information to the terminal device may specifically include: sending, by the base station device, the second control information to the terminal device according to the system information, and the sending, by a base station device, first control information to a terminal device may specifically include: sending, by the base station device, the first control information to the terminal device according to the system information.

With reference to the first aspect and the foregoing possible implementation, in another possible implementation, in the solution to repeated transmission of the multicast service data, some parameters used to control repeated transmission of the multicast service data may be included in third control information. Therefore, before the sending, by the base station device, the multicast service data to the terminal device according to the first control information, the data transmission method may further include: sending, by the base station device to the terminal device, third control information used to control repeated transmission of the multicast service data. In this case, the sending, by the base station device, the multicast service data to the terminal device according to the first control information may specifically include: sending, by the base station device, the multicast service data to the terminal device according to the first control information and the third control information.

With reference to the first aspect and the foregoing possible implementation, in another possible implementation, to further increase the success rate of receiving the multicast service data by the terminal device, the third control information used to control repeated transmission of the multicast service data may also be transmitted repeatedly. In this case, the first control information sent by the base station device to the terminal device is further used to control repeated transmission of the third control information. Correspondingly, the sending, by the base station device, third control information to the terminal device may specifically include: sending, by the base station device, the third control information to the terminal device according to the first control information.

With reference to the first aspect and the foregoing possible implementation, in another possible implementation, in the solution to repeated transmission of the multicast service data, parameters used to control repeated transmission of the multicast service data may be included in the third control information. In this case, the first control information is specifically used to control repeated transmission of the third control information. Therefore, before the sending, by the base station device, the multicast service data to the terminal device according to the first control information, the data transmission method may further include: sending, by the base station device to the terminal device, the third control information used to control repeated transmission of the multicast service data. Correspondingly, the sending, by the base station device, the multicast service data to the terminal device according to the first control information may specifically include: sending, by the base station device, the multicast service data to the terminal device according to the third control information.

With reference to the first aspect and the foregoing possible implementation, in another possible implementation, after the first control information changes, to instruct the terminal device to receive the first control information again, before the sending, by a base station device, first control information to a terminal device, the data transmission method may further include: sending, by the base station device to the terminal device, a change notification carrying a first radio network temporary identity (RNTI) and used to notify that the first control information changes.

With reference to the first aspect and the foregoing possible implementation, in another possible implementation, to further increase the success rate of receiving the multicast service data by the terminal device, the change notification used to notify that the first control information changes may also be transmitted repeatedly. Therefore, before the sending, by the base station device, a change notification to the terminal device, the data transmission method may further include: sending, by the base station device to the terminal device, system information used to control repeated transmission of the change notification. In this case, correspondingly, the sending, by the base station device, a change notification to the terminal device may specifically include: sending, by the base station device, the change notification to the terminal device according to the system information.

With reference to the first aspect and the foregoing possible implementation, in another possible implementation, when the first control information is used to control repeated transmission of the multicast service data, the first control information may include a first configuration parameter, and the first configuration parameter includes at least one of the following: a first offset, a first scheduling period, a first start time, a first repetition quantity, a first repetition pattern, a modulation and coding scheme (MCS), a transport block size (TBS), a session identity (session ID), a temporary mobile group identity (TMGI), and first frequency information, where the first scheduling period is used to determine a system frame number and a start subframe number for transmitting the multicast service data, or the first offset and the first scheduling period are used to determine a system frame number and a start subframe number for transmitting the multicast service data, and the first start time is used to determine a first start symbol for transmitting the multicast service data; or the first configuration parameter includes at least one of the following: a first offset, a first scheduling period, a first start time, a first end time, a first repetition quantity, a first repetition pattern, an MCS, a TBS, a session ID, a TMGI, and first frequency information, where the first scheduling period is used to determine a system frame number for transmitting the multicast service data, or the first offset and the first scheduling period are used to determine a system frame number for transmitting the multicast service data, and the first start time is used to determine a first start subframe number and/or a first start symbol for transmitting the multicast service data, where the first end time includes a first end subframe number and/or a first end symbol, the first frequency information is used to indicate a frequency for sending the multicast service data, and the first frequency information includes at least one of the following: a narrow band center frequency and a narrow band index value. In this case, correspondingly, the sending, by the base station device, the multicast service data to the terminal device according to the first control information may specifically include: sending, by the base station device, the multicast service data to the terminal device according to the first configuration parameter.

When the first control information is used to control repeated transmission of the third control information, the first scheduling period is used to determine a system frame number and a start subframe number for sending the third control information, or the first offset and the first scheduling period are used to determine a system frame number and a start subframe number for sending the third control information, and the first start time is used to determine a first start symbol for sending the third control information; or the first scheduling period is used to determine a system frame number for sending the third control information, or the first offset and the first scheduling period are used to determine a system frame number for sending the third control information, the first start time is used to determine a first start subframe number and/or a first start symbol for sending the third control information, and the first frequency information is used to indicate a frequency for sending the third control information.

With reference to the first aspect and the foregoing possible implementation, in another possible implementation, when the third control information is used to control repeated transmission of the multicast service data, the third control information may include a first configuration parameter, and the first configuration parameter may include at least one of the following: a first offset, a first repetition quantity, a first repetition pattern, an MCS, a TBS, and first frequency information, where the first offset is an offset used to indicate that a start time of the multicast service data is later than a start time or an end time of the third control information, the start time is a start subframe number or a start system frame number, the end time is an end subframe number or an end system frame number, the first frequency information is used to indicate a frequency for sending the multicast service data, and the first frequency information includes at least one of the following: a narrow band center frequency and a narrow band index value.

With reference to the first aspect and the foregoing possible implementation, in another possible implementation, when the system information is used to control repeated transmission of the change notification, the system information may include a second configuration parameter; and the second configuration parameter may include at least one of the following: a second offset, a second scheduling period, a second start time, a second repetition quantity, a second repetition pattern, and second frequency information, where the second scheduling period is used to determine a system frame number and a start subframe number for transmitting the change notification, or the second offset and the second scheduling period are used to determine a system frame number and a start subframe number for transmitting the change notification, and the second start time is used to determine a second start symbol for transmitting the change notification; or the second configuration parameter includes at least one of the following: a second offset, a second scheduling period, a second start time, a second end time, a second repetition quantity, a second repetition pattern, and second frequency information, where the second scheduling period is used to determine a system frame number for transmitting the change notification, or the second offset and the second scheduling period are used to determine a system frame number for transmitting the change notification, and the second start time is used to determine a second start subframe number and/or a second start symbol for transmitting the change notification, where the second end time includes a second end subframe number and/or a second end symbol, the second frequency information is used to indicate a frequency for sending the change notification, and the second frequency information includes at least one of the following: a narrow band center frequency and a narrow band index value. In this case, correspondingly, the sending, by the base station device, the change notification to the terminal device according to the system information may specifically include: sending, by the base station device, the change notification to the terminal device according to the second configuration parameter.

With reference to the first aspect and the foregoing possible implementation, in another possible implementation, after the first control information changes, to reduce a delay in receiving the first control information and the multicast service data by the terminal device when the terminal device is instructed to receive the first control information again, the second control information sent by the base station device to the terminal device is scrambled by using a first RNTI or a second RNTI, where the first RNTI is used to scramble the second control information when the first control information changes, the first RNTI is further used to indicate that the first control information changes, and the second RNTI is used to scramble the second control information when the first control information does not change; or the second control information sent by the base station device to the terminal device is further used to notify that the first control information changes.

With reference to the first aspect and the foregoing possible implementation, in another possible implementation, when the system information is used to control repeated transmission of the second control information, the system information may include a third configuration parameter; and the third configuration parameter may include at least one of the following: a third offset, a third scheduling period, a third start time, a third repetition quantity, a third repetition pattern, and third frequency information, where the third scheduling period is used to determine a system frame number and a start subframe number for transmitting the second control information, or the third offset and the third scheduling period are used to determine a system frame number and a start subframe number for transmitting the second control information, and the third start time is used to determine a third start symbol for transmitting the second control information; or the third configuration parameter includes at least one of the following: a third offset, a third scheduling period, a third start time, a third end time, a third repetition quantity, a third repetition pattern, and third frequency information, where the third scheduling period is used to determine a system frame number for transmitting the second control information, or the third offset and the third scheduling period are used to determine a system frame number for transmitting the second control information, and the third start time is used to determine a third start subframe number and/or a third start symbol for transmitting the second control information, where the third end time includes a third end subframe number and/or a third end symbol, the third frequency information is used to indicate a frequency for sending the second control information, and the third frequency information includes at least one of the following: a narrow band center frequency and a narrow band index value. In this case, the sending, by the base station device, the second control information to the terminal device according to the system information may specifically include: sending, by the base station device, the second control information to the terminal device according to the third configuration parameter.

With reference to the first aspect and the foregoing possible implementation, in another possible implementation, when the system information is used to control repeated transmission of the first control information, the system information may include a fourth configuration parameter; and when the first control information does not require segment transmission, the fourth configuration parameter may include at least one of the following: a fourth offset, a fourth scheduling period, a fourth start time, a fourth repetition quantity, a fourth repetition pattern, an MCS, a TBS, and fourth frequency information, where the fourth scheduling period is used to determine a system frame number and a start subframe number for transmitting the first control information, or the fourth offset and the fourth scheduling period are used to determine a system frame number and a start subframe number for transmitting the first control information, and the fourth start time is used to determine a fourth start symbol for transmitting the first control information; or the fourth configuration parameter includes at least one of the following: a fourth offset, a fourth scheduling period, a fourth start time, a fourth end time, a fourth repetition quantity, a fourth repetition pattern, an MCS, a TBS, and fourth frequency information, where the fourth scheduling period is used to determine a system frame number for transmitting the first control information, or the fourth offset and the fourth scheduling period are used to determine a system frame number for transmitting the first control information, and the fourth start time is used to determine a fourth start subframe number and/or a fourth start symbol for transmitting the first control information, where the fourth end time includes a fourth end subframe number and/or a fourth end symbol, the fourth frequency information is used to indicate a frequency for sending the first control information, and the fourth frequency information includes at least one of the following: a narrow band center frequency and a narrow band index value; or when the first control information requires segment transmission, the fourth configuration parameter may further include at least one of the following: a segment quantity and a repetition mode, where the repetition mode is: alternately transmitting different segment information; or after repeated transmission of current segment information is complete, repeatedly transmitting next segment information. In this case, the sending, by the base station device, the first control information to the terminal device according to the system information may specifically include: sending, by the base station device, the first control information to the terminal device according to the fourth configuration parameter.

With reference to the first aspect and the foregoing possible implementation, in another possible implementation, when the second control information is used to control repeated transmission of the first control information, the second control information may include a fourth configuration parameter; and when the first control information does not require segment transmission, the fourth configuration parameter may include at least one of the following: a fourth offset, a fourth scheduling period, a fourth start time, a fourth repetition quantity, a fourth repetition pattern, an MCS, a TBS, and fourth frequency information; or the fourth configuration parameter includes at least one of the following: a fourth offset, a fourth scheduling period, a fourth start time, a fourth end time, a fourth repetition quantity, a fourth repetition pattern, an MCS, a TBS, and fourth frequency information; or when the first control information requires segment transmission, the fourth configuration parameter may further include at least one of the following: a segment quantity and a repetition mode. In this case, the sending, by the base station device, the first control information to the terminal device according to the second control information may specifically include: sending, by the base station device, the first control information to the terminal device according to the fourth configuration parameter.

With reference to the first aspect and the foregoing possible implementation, in another possible implementation, when the first control information is used to control repeated transmission of the third control information, the first control information may include a fifth configuration parameter; and the fifth configuration parameter may include at least one of the following: a fifth offset, a fifth scheduling period, a fifth start time, a fifth repetition quantity, a fifth repetition pattern, and fifth frequency information, where the fifth offset is an offset used to indicate that a start time of the third control information is later than a start time or an end time of the first control information, or the fifth scheduling period is used to determine a system frame number and a start subframe number for transmitting the third control information, or the fifth offset and the fifth scheduling period are used to determine a system frame number and a start subframe number for transmitting the third control information, and the fifth start time is used to determine a fifth start symbol for transmitting the third control information; or the fifth configuration parameter includes at least one of the following: a fifth offset, a fifth scheduling period, a fifth start time, a fifth end time, a fifth repetition quantity, a fifth repetition pattern, and fifth frequency information, where the fifth offset is an offset used to indicate that a start time of the third control information is later than a start time or an end time of the first control information, or the fifth scheduling period is used to determine a system frame number for transmitting the third control information, or the fifth offset and the fifth scheduling period are used to determine a system frame number for transmitting the third control information, and the fifth start time is used to determine a fifth start subframe number and/or a fifth start symbol for transmitting the third control information, where the fifth end time includes a fifth end subframe number and/or a fifth end symbol, the fifth frequency information is used to indicate a frequency for sending the third control information, and the fifth frequency information includes at least one of the following: a narrow band center frequency and a narrow band index value. In this case, the sending, by the base station device, the third control information to the terminal device according to the first control information may specifically include: sending, by the base station device, the third control information to the terminal device according to the fifth configuration parameter.

According to a second aspect, an embodiment of the present invention provides a data transmission method, including: receiving, by a terminal device, first control information sent by a base station device and used to control repeated transmission of multicast service data; and receiving, according to the first control information, the multicast service data sent by the base station device.

In the data transmission method provided by the present invention, the terminal device receives the first control information sent by the base station device and used to control repeated transmission of the multicast service data, so that the terminal device can receive, according to the first control information, the multicast service data repeatedly sent by the base station device. Therefore, a success rate of receiving the multicast service data by the terminal device is increased. Therefore, in MTC in which an SC-PTM technology is introduced, an MTC terminal can receive, according to received first control information, multicast service data repeatedly sent by a base station, and a success rate of receiving data by the MTC terminal is increased.

With reference to the second aspect, in a possible implementation, to further increase the success rate of receiving the multicast service data by the terminal device, the base station device may also repeatedly transmit the first control information used to control repeated transmission of the multicast service data. Therefore, before the receiving, by a terminal device, first control information sent by a base station device, the data transmission method may further include: receiving, by the terminal device, system information sent by the base station device and used to control repeated transmission of the first control information. In this case, correspondingly, the receiving, by a terminal device, first control information sent by a base station device may specifically include: receiving, by the terminal device according to the system information, the first control information sent by the base station device.

With reference to the second aspect and the foregoing possible implementation, in another possible implementation, to further increase the success rate of receiving the multicast service data by the terminal device, the base station device may also repeatedly transmit the first control information used to control repeated transmission of the multicast service data. Therefore, before the receiving, by a terminal device, first control information sent by a base station device, the data transmission method may further include: receiving, by the terminal device, second control information sent by the base station device and used to control repeated transmission of the first control information. In this case, correspondingly, the receiving, by a terminal device, first control information sent by a base station device may specifically include: receiving, by the terminal device according to the second control information, the first control information sent by the base station device.

With reference to the second aspect and the foregoing possible implementation, in another possible implementation, to further increase the success rate of receiving the multicast service data by the terminal device, the base station device may also repeatedly transmit the second control information used to control repeated transmission of the first control information. Therefore, before the receiving, by the terminal device, second control information sent by the base station device, the data transmission method may further include: receiving, by the terminal device, system information sent by the base station device and used to control repeated transmission of the second control information. In this case, correspondingly, the receiving, by the terminal device, second control information sent by the base station device may specifically include: receiving, by the terminal device according to the system information, the second control information sent by the base station device. Alternatively, in the solution to repeated transmission of the first control information, the base station device includes some parameters used to control repeated transmission of the first control information into system information. Therefore, before the receiving, by the terminal device, second control information sent by the base station device, the data transmission method may further include: receiving, by the terminal device, system information sent by the base station device and used to control repeated transmission of the first control information. In this case, correspondingly, the receiving, by a terminal device, first control information sent by a base station device may specifically include: receiving, by the terminal device according to the system information, the first control information sent by the base station device. Alternatively, to further increase the success rate of receiving the multicast service data by the terminal device, the base station device may also repeatedly transmit the second control information used to control repeated transmission of the first control information. In addition, in the solution to repeated transmission of the first control information, the base station device includes some parameters used to control repeated transmission of the first control information into system information. Therefore, before the receiving, by the terminal device, second control information sent by the base station device, the data transmission method may further include: receiving, by the terminal device, system information sent by the base station device and used to control repeated transmission of the second control information and used to control repeated transmission of the first control information. In this case, correspondingly, the receiving, by the terminal device, second control information sent by the base station device may specifically include: receiving, by the terminal device according to the system information, the second control information sent by the base station; in addition, the receiving, by a terminal device, first control information sent by a base station device may specifically include: receiving, by the terminal device, the first control information sent by the base station device according to the system information.

With reference to the second aspect and the foregoing possible implementation, in another possible implementation, in the solution to repeated transmission of the multicast service data, the base station device includes some parameters used to control repeated transmission of the multicast service data into third control information. Therefore, before the receiving, by the terminal device according to the first control information, the multicast service data sent by the base station device, the data transmission method may further include: receiving, by the terminal device, third control information sent by the base station device and used to control repeated transmission of the multicast service data. In this case, the receiving, by the terminal device according to the first control information, the multicast service data sent by the base station device may specifically include: receiving, by the terminal device according to the first control information and the third control information, the multicast service data sent by the base station device.

With reference to the second aspect and the foregoing possible implementation, in another possible implementation, to further increase the success rate of receiving the multicast service data by the terminal device, the base station device also repeatedly transmits the third control information used to control repeated transmission of the multicast service data. In this case, the first control information sent by the base station device and received by the terminal device is further used to control repeated transmission of the third control information. Correspondingly, the receiving, by the terminal device, third control information sent by the base station device may specifically include: receiving, by the terminal device according to the first control information, the third control information sent by the base station device.

With reference to the second aspect and the foregoing possible implementation, in another possible implementation, in the solution to repeated transmission of the multicast service data, the base station device includes parameters used to control repeated transmission of the multicast service data into the third control information, but in this case, the first control information is specifically used to control repeated transmission of the third control information. Therefore, before the receiving, by the terminal device according to the first control information, the multicast service data sent by the base station device, the data transmission method may further include: receiving, by the terminal device, the third control information sent by the base station device and used to control repeated transmission of the multicast service data. Correspondingly, the receiving, by the terminal device according to the first control information, the multicast service data sent by the base station device may specifically include: receiving, by the terminal device according to the third control information, the multicast service data sent by the base station device.

With reference to the second aspect and the foregoing possible implementation, in another possible implementation, after the first control information changes, in order that the base station device instructs the terminal device to receive the first control information again, before the receiving, by a terminal device, first control information sent by a base station device, the data transmission method may further include: receiving, by the terminal device, a change notification sent by the base station device, where the change notification carries a first RNTI and is used to notify that the first control information changes.

With reference to the second aspect and the foregoing possible implementation, in another possible implementation, to further increase the success rate of receiving the multicast service data by the terminal device, the base station device may also repeatedly transmit the change notification used to notify that the first control information changes. Therefore, before the receiving, by the terminal device, a change notification sent by the base station device, the data transmission method may further include: receiving, by the terminal device, system information sent by the base station device and used to control repeated transmission of the change notification. In this case, correspondingly, the receiving, by the terminal device, a change notification sent by the base station device may specifically include: receiving, by the terminal device according to the system information, the change notification sent by the base station device.

With reference to the second aspect and the foregoing possible implementation, in another possible implementation, when the first control information is used to control repeated transmission of the multicast service data, the first control information may include a first configuration parameter; and the first configuration parameter may include at least one of the following: a first offset, a first scheduling period, a first start time, a first repetition quantity, a first repetition pattern, an MCS, a TBS, a session ID, a TMGI, and first frequency information, where the first scheduling period is used to determine a system frame number and a start subframe number for transmitting the multicast service data, or the first offset and the first scheduling period are used to determine a system frame number and a start subframe number for transmitting the multicast service data, and the first start time is used to determine a first start symbol for transmitting the multicast service data; or the first configuration parameter includes at least one of the following: a first offset, a first scheduling period, a first start time, a first end time, a first repetition quantity, a first repetition pattern, an MCS, a TBS, a session ID, a TMGI, and first frequency information, where the first scheduling period is used to determine a system frame number for transmitting the multicast service data, or the first offset and the first scheduling period are used to determine a system frame number for transmitting the multicast service data, and the first start time is used to determine a first start subframe number and/or a first start symbol for transmitting the multicast service data, where the first end time includes a first end subframe number and/or a first end symbol, the first frequency information is used to indicate a frequency for sending the multicast service data, and the first frequency information includes at least one of the following: a narrow band center frequency and a narrow band index value. In this case, correspondingly, the receiving, by the terminal device according to the first control information, the multicast service data sent by the base station device may specifically include: receiving, by the terminal device according to the first configuration parameter, the multicast service data sent by the base station device.

When the first control information is used to control repeated transmission of the third control information, the first scheduling period is used to determine a system frame number and a start subframe number for sending the third control information, or the first offset and the first scheduling period are used to determine a system frame number and a start subframe number for sending the third control information, and the first start time is used to determine a first start symbol for sending the third control information; or the first scheduling period is used to determine a system frame number for sending the third control information, or the first offset and the first scheduling period are used to determine a system frame number for sending the third control information, the first start time is used to determine a first start subframe number and/or a first start symbol for sending the third control information, and the first frequency information is used to indicate a frequency for sending the third control information.

With reference to the second aspect and the foregoing possible implementation, in another possible implementation, when the third control information is used to control repeated transmission of the multicast service data, the third control information may include a first configuration parameter, and the first configuration parameter may include at least one of the following: a first offset, a first repetition quantity, a first repetition pattern, an MCS, a TBS, and first frequency information, where the first offset is an offset used to indicate that a start time of the multicast service data is later than a start time or an end time of the third control information, the start time is a start subframe number or a start system frame number, the end time is an end subframe number or an end system frame number, the first frequency information is used to indicate a frequency for sending the multicast service data, and the first frequency information includes at least one of the following: a narrow band center frequency and a narrow band index value.

With reference to the second aspect and the foregoing possible implementation, in another possible implementation, when the system information is used to control repeated transmission of the change notification, the system information may include a second configuration parameter; and the second configuration parameter may include at least one of the following: a second offset, a second scheduling period, a second start time, a second repetition quantity, a second repetition pattern, and second frequency information, where the second scheduling period is used to determine a system frame number and a start subframe number for transmitting the change notification, or the second offset and the second scheduling period are used to determine a system frame number and a start subframe number for transmitting the change notification, and the second start time is used to determine a second start symbol for transmitting the change notification; or the second configuration parameter includes at least one of the following: a second offset, a second scheduling period, a second start time, a second end time, a second repetition quantity, a second repetition pattern, and second frequency information, where the second scheduling period is used to determine a system frame number for transmitting the change notification, or the second offset and the second scheduling period are used to determine a system frame number for transmitting the change notification, and the second start time is used to determine a second start subframe number and/or a second start symbol for transmitting the change notification, where the second end time includes a second end subframe number and/or a second end symbol, the second frequency information is used to indicate a frequency for sending the change notification, and the second frequency information includes at least one of the following: a narrow band center frequency and a narrow band index value. In this case, correspondingly, the receiving, by the terminal device according to the system information, the change notification sent by the base station device may specifically include: receiving, by the terminal device according to the second configuration parameter, the change notification sent by the base station device.

With reference to the second aspect and the foregoing possible implementation, in another possible implementation, after the first control information changes, to reduce a delay in receiving the first control information and the multicast service data by the terminal device when the base station device instructs the terminal device to receive the first control information again, the second control information sent by the base station device and received by the terminal device is scrambled by using a first RNTI or a second RNTI, where the first RNTI is used to scramble the second control information when the first control information changes, the first RNTI is further used to indicate that the first control information changes, and the second RNTI is used to scramble the second control information when the first control information does not change; or the second control information sent by the base station device and received by the terminal device is used to notify that the first control information changes.

With reference to the second aspect and the foregoing possible implementation, in another possible implementation, when the system information is used to control repeated transmission of the second control information, the system information may include a third configuration parameter; and the third configuration parameter may include at least one of the following: a third offset, a third scheduling period, a third start time, a third repetition quantity, a third repetition pattern, and third frequency information, where the third scheduling period is used to determine a system frame number and a start subframe number for transmitting the second control information, or the third offset and the third scheduling period are used to determine a system frame number and a start subframe number for transmitting the second control information, and the third start time is used to determine a third start symbol for transmitting the second control information; or the third configuration parameter includes at least one of the following: a third offset, a third scheduling period, a third start time, a third end time, a third repetition quantity, a third repetition pattern, and third frequency information, where the third scheduling period is used to determine a system frame number for transmitting the second control information, or the third offset and the third scheduling period are used to determine a system frame number for transmitting the second control information, and the third start time is used to determine a third start subframe number and/or a third start symbol for transmitting the second control information, where the third end time includes a third end subframe number and/or a third end symbol, the third frequency information is used to indicate a frequency for sending the second control information, and the third frequency information includes at least one of the following: a narrow band center frequency and a narrow band index value. In this case, the receiving, by the terminal device according to the system information, the second control information sent by the base station device may specifically include: receiving, by the terminal device according to the third configuration parameter, the second control information sent by the base station device.

With reference to the second aspect and the foregoing possible implementation, in another possible implementation, when the system information is used to control repeated transmission of the first control information, the system information may include a fourth configuration parameter; and when the first control information does not require segment transmission, the fourth configuration parameter may include at least one of the following: a fourth offset, a fourth scheduling period, a fourth start time, a fourth repetition quantity, a fourth repetition pattern, an MCS, a TBS, and fourth frequency information, where the fourth scheduling period is used to determine a system frame number and a start subframe number for transmitting the first control information, or the fourth offset and the fourth scheduling period are used to determine a system frame number and a start subframe number for transmitting the first control information, and the fourth start time is used to determine a fourth start symbol for transmitting the first control information; or the fourth configuration parameter includes at least one of the following: a fourth offset, a fourth scheduling period, a fourth start time, a fourth end time, a fourth repetition quantity, a fourth repetition pattern, an MCS, a TBS, and fourth frequency information, where the fourth scheduling period is used to determine a system frame number for transmitting the first control information, or the fourth offset and the fourth scheduling period are used to determine a system frame number for transmitting the first control information, and the fourth start time is used to determine a fourth start subframe number and/or a fourth start symbol for transmitting the first control information, where the fourth end time includes a fourth end subframe number and/or a fourth end symbol, the fourth frequency information is used to indicate a frequency for sending the first control information, and the fourth frequency information includes at least one of the following: a narrow band center frequency and a narrow band index value; or when the first control information requires segment transmission, the fourth configuration parameter may further include at least one of the following: a segment quantity and a repetition mode, where the repetition mode is: alternately transmitting different segment information; or after repeated transmission of current segment information is complete, repeatedly transmitting next segment information. In this case, the receiving, by the terminal device according to the system information, the first control information sent by the base station device may specifically include: receiving, by the terminal device according to the fourth configuration parameter, the first control information sent by the base station device.

With reference to the second aspect and the foregoing possible implementation, in another possible implementation, when the second control information is used to control repeated transmission of the first control information, the second control information may include a fourth configuration parameter; and when the first control information does not require segment transmission, the fourth configuration parameter may include at least one of the following: a fourth offset, a fourth scheduling period, a fourth start time, a fourth repetition quantity, a fourth repetition pattern, an MCS, a TBS, and fourth frequency information; or the fourth configuration parameter includes at least one of the following: a fourth offset, a fourth scheduling period, a fourth start time, a fourth end time, a fourth repetition quantity, a fourth repetition pattern, an MCS, a TBS, and fourth frequency information; or when the first control information requires segment transmission, the fourth configuration parameter may further include at least one of the following: a segment quantity and a repetition mode. In this case, the receiving, by the terminal device according to the second control information, the first control information sent by the base station device may specifically include: receiving, by the terminal device according to the fourth configuration parameter, the first control information sent by the base station device.

With reference to the second aspect and the foregoing possible implementation, in another possible implementation, when the first control information is used to control repeated transmission of the third control information, the first control information may include a fifth configuration parameter; and the fifth configuration parameter may include at least one of the following: a fifth offset, a fifth scheduling period, a fifth start time, a fifth repetition quantity, a fifth repetition pattern, and fifth frequency information, where the fifth offset is an offset used to indicate that a start time of the third control information is later than a start time or an end time of the first control information, or the fifth scheduling period is used to determine a system frame number and a start subframe number for transmitting the third control information, or the fifth offset and the fifth scheduling period are used to determine a system frame number and a start subframe number for transmitting the third control information, and the fifth start time is used to determine a fifth start symbol for transmitting the third control information; or the fifth configuration parameter includes at least one of the following: a fifth offset, a fifth scheduling period, a fifth start time, a fifth end time, a fifth repetition quantity, a fifth repetition pattern, and fifth frequency information, where the fifth offset is an offset used to indicate that a start time of the third control information is later than a start time or an end time of the first control information, or the fifth scheduling period is used to determine a system frame number for transmitting the third control information, or the fifth offset and the fifth scheduling period are used to determine a system frame number for transmitting the third control information, and the fifth start time is used to determine a fifth start subframe number and/or a fifth start symbol for transmitting the third control information, where the fifth end time includes a fifth end subframe number and/or a fifth end symbol, the fifth frequency information is used to indicate a frequency for sending the third control information, and the fifth frequency information includes at least one of the following: a narrow band center frequency and a narrow band index value. In this case, the receiving, by the terminal device according to the first control information, the third control information sent by the base station device may specifically include: receiving, by the terminal device according to the fifth configuration parameter, the third control information sent by the base station device.

According to a third aspect, an embodiment of the present invention provides a base station device, including: a processing unit, configured to determine first control information, where the first control information is used to control repeated transmission of multicast service data; and a sending unit, configured to send the first control information determined by the processing unit to a terminal device, and send the multicast service data to the terminal device according to the first control information.

With reference to the third aspect, in a possible implementation, the sending unit is further configured to send system information to the terminal device, where the system information is used to control repeated transmission of the first control information.

With reference to the third aspect and the foregoing possible implementation, in another possible implementation, the sending unit is further configured to send second control information to the terminal device, where the second control information is used to control repeated transmission of the first control information.

With reference to the third aspect and the foregoing possible implementation, in another possible implementation, the sending unit is further configured to send system information to the terminal device, where the system information is used to control repeated transmission of the second control information, and/or the system information is used to control repeated transmission of the first control information.

With reference to the third aspect and the foregoing possible implementation, in another possible implementation, the sending unit is further configured to send third control information to the terminal device, where the third control information is used to control repeated transmission of the multicast service data.

With reference to the third aspect and the foregoing possible implementation, in another possible implementation, the first control information sent by the sending unit is specifically used to control repeated transmission of the third control information; or the first control information sent by the sending unit is further used to control repeated transmission of the third control information.

With reference to the third aspect and the foregoing possible implementation, in another possible implementation, the sending unit is further configured to send a change notification to the terminal device, where the change notification is used to notify that the first control information changes, and the change notification carries a first radio network temporary identity RNTI.

With reference to the third aspect and the foregoing possible implementation, in another possible implementation, the sending unit is further configured to send system information to the terminal device, where the system information is used to control repeated transmission of the change notification.

With reference to the third aspect and the foregoing possible implementation, in another possible implementation, the first control information sent by the sending unit includes a first configuration parameter; and the first configuration parameter includes at least one of the following: a first offset, a first scheduling period, a first start time, a first repetition quantity, a first repetition pattern, a modulation and coding scheme MCS, a transport block size TBS, a session identity session ID, a temporary mobile group identity TMGI, and first frequency information, where the first scheduling period is used to determine a system frame number and a start subframe number for transmitting the multicast service data or sending the third control information, or the first offset and the first scheduling period are used to determine a system frame number and a start subframe number for transmitting the multicast service data or sending the third control information, and the first start time is used to determine a first start symbol for transmitting the multicast service data or sending the third control information; or the first configuration parameter includes at least one of the following: a first offset, a first scheduling period, a first start time, a first end time, a first repetition quantity, a first repetition pattern, an MCS, a TBS, a session ID, a TMGI, and first frequency information, where the first scheduling period is used to determine a system frame number for transmitting the multicast service data or sending the third control information, or the first offset and the first scheduling period are used to determine a system frame number for transmitting the multicast service data or sending the third control information, and the first start time is used to determine a first start subframe number and/or a first start symbol for transmitting the multicast service data or sending the third control information, where the first end time includes a first end subframe number and/or a first end symbol, the first frequency information is used to indicate a frequency for sending the multicast service data or sending the third control information, and the first frequency information includes at least one of the following: a narrow band center frequency and a narrow band index value.

With reference to the third aspect and the foregoing possible implementation, in another possible implementation, the third control information sent by the sending unit includes a first configuration parameter, and the first configuration parameter includes at least one of the following: a first offset, a first repetition quantity, a first repetition pattern, an MCS, a TBS, and first frequency information, where the first offset is an offset used to indicate that a start time of the multicast service data is later than a start time or an end time of the third control information, the start time is a start subframe number or a start system frame number, the end time is an end subframe number or an end system frame number, the first frequency information is used to indicate a frequency for sending the multicast service data, and the first frequency information includes at least one of the following: a narrow band center frequency and a narrow band index value.

With reference to the third aspect and the foregoing possible implementation, in another possible implementation, the system information sent by the sending unit includes a second configuration parameter; and the second configuration parameter includes at least one of the following: a second offset, a second scheduling period, a second start time, a second repetition quantity, a second repetition pattern, and second frequency information, where the second scheduling period is used to determine a system frame number and a start subframe number for transmitting the change notification, or the second offset and the second scheduling period are used to determine a system frame number and a start subframe number for transmitting the change notification, and the second start time is used to determine a second start symbol for transmitting the change notification; or the second configuration parameter includes at least one of the following: a second offset, a second scheduling period, a second start time, a second end time, a second repetition quantity, a second repetition pattern, and second frequency information, where the second scheduling period is used to determine a system frame number for transmitting the change notification, or the second offset and the second scheduling period are used to determine a system frame number for transmitting the change notification, and the second start time is used to determine a second start subframe number and/or a second start symbol for transmitting the change notification, where the second end time includes a second end subframe number and/or a second end symbol, the second frequency information is used to indicate a frequency for sending the change notification, and the second frequency information includes at least one of the following: a narrow band center frequency and a narrow band index value.

With reference to the third aspect and the foregoing possible implementation, in another possible implementation, the second control information sent by the sending unit is scrambled by using a first RNTI or a second RNTI, where the first RNTI is used to scramble the second control information when the first control information changes, the first RNTI is further used to indicate that the first control information changes, and the second RNTI is used to scramble the second control information when the first control information does not change; or the second control information is further used to notify that the first control information changes.

With reference to the third aspect and the foregoing possible implementation, in another possible implementation, the system information sent by the sending unit includes a third configuration parameter; and the third configuration parameter includes at least one of the following: a third offset, a third scheduling period, a third start time, a third repetition quantity, a third repetition pattern, and third frequency information, where the third scheduling period is used to determine a system frame number and a start subframe number for transmitting the second control information, or the third offset and the third scheduling period are used to determine a system frame number and a start subframe number for transmitting the second control information, and the third start time is used to determine a third start symbol for transmitting the second control information; or the third configuration parameter includes at least one of the following: a third offset, a third scheduling period, a third start time, a third end time, a third repetition quantity, a third repetition pattern, and third frequency information, where the third scheduling period is used to determine a system frame number for transmitting the second control information, or the third offset and the third scheduling period are used to determine a system frame number for transmitting the second control information, and the third start time is used to determine a third start subframe number and/or a third start symbol for transmitting the second control information, where the third end time includes a third end subframe number and/or a third end symbol, the third frequency information is used to indicate a frequency for sending the second control information, and the third frequency information includes at least one of the following: a narrow band center frequency and a narrow band index value.

With reference to the third aspect and the foregoing possible implementation, in another possible implementation, the system information sent by the sending unit includes a fourth configuration parameter; and when the first control information does not require segment transmission, the fourth configuration parameter includes at least one of the following: a fourth offset, a fourth scheduling period, a fourth start time, a fourth repetition quantity, a fourth repetition pattern, an MCS, a TBS, and fourth frequency information, where the fourth scheduling period is used to determine a system frame number and a start subframe number for transmitting the first control information, or the fourth offset and the fourth scheduling period are used to determine a system frame number and a start subframe number for transmitting the first control information, and the fourth start time is used to determine a fourth start symbol for transmitting the first control information; or the fourth configuration parameter includes at least one of the following: a fourth offset, a fourth scheduling period, a fourth start time, a fourth end time, a fourth repetition quantity, a fourth repetition pattern, an MCS, a TBS, and fourth frequency information, where the fourth scheduling period is used to determine a system frame number for transmitting the first control information, or the fourth offset and the fourth scheduling period are used to determine a system frame number for transmitting the first control information, and the fourth start time is used to determine a fourth start subframe number and/or a fourth start symbol for transmitting the first control information, where the fourth end time includes a fourth end subframe number and/or a fourth end symbol, the fourth frequency information is used to indicate a frequency for sending the first control information, and the fourth frequency information includes at least one of the following: a narrow band center frequency and a narrow band index value; or when the first control information requires segment transmission, the fourth configuration parameter further includes at least one of the following: a segment quantity and a repetition mode, where the repetition mode is: alternately transmitting different segment information; or after repeated transmission of current segment information is complete, repeatedly transmitting next segment information.

With reference to the third aspect and the foregoing possible implementation, in another possible implementation, the second control information sent by the sending unit includes a fourth configuration parameter; and when the first control information does not require segment transmission, the fourth configuration parameter includes at least one of the following: a fourth offset, a fourth scheduling period, a fourth start time, a fourth repetition quantity, a fourth repetition pattern, an MCS, a TBS, and fourth frequency information; or the fourth configuration parameter includes at least one of the following: a fourth offset, a fourth scheduling period, a fourth start time, a fourth end time, a fourth repetition quantity, a fourth repetition pattern, an MCS, a TBS, and fourth frequency information; or when the first control information requires segment transmission, the fourth configuration parameter further includes at least one of the following: a segment quantity and a repetition mode.

With reference to the third aspect and the foregoing possible implementation, in another possible implementation, the first control information sent by the sending unit includes a fifth configuration parameter; and the fifth configuration parameter includes at least one of the following: a fifth offset, a fifth scheduling period, a fifth start time, a fifth repetition quantity, a fifth repetition pattern, and fifth frequency information, where the fifth offset is an offset used to indicate that a start time of the third control information is later than a start time or an end time of the first control information, or the fifth scheduling period is used to determine a system frame number and a start subframe number for transmitting the third control information, or the fifth offset and the fifth scheduling period are used to determine a system frame number and a start subframe number for transmitting the third control information, and the fifth start time is used to determine a fifth start symbol for transmitting the third control information; or the fifth configuration parameter includes at least one of the following: a fifth offset, a fifth scheduling period, a fifth start time, a fifth end time, a fifth repetition quantity, a fifth repetition pattern, and fifth frequency information, where the fifth offset is an offset used to indicate that a start time of the third control information is later than a start time or an end time of the first control information, or the fifth scheduling period is used to determine a system frame number for transmitting the third control information, or the fifth offset and the fifth scheduling period are used to determine a system frame number for transmitting the third control information, and the fifth start time is used to determine a fifth start subframe number and/or a fifth start symbol for transmitting the third control information, where the fifth end time includes a fifth end subframe number and/or a fifth end symbol, the fifth frequency information is used to indicate a frequency for sending the third control information, and the fifth frequency information includes at least one of the following: a narrow band center frequency and a narrow band index value.

For specific implementations, refer to actions and functions of the base station device in the data transmission method provided by the first aspect or the possible implementations of the first aspect. Details are not further described herein.

According to a fourth aspect, an embodiment of the present invention provides a terminal device, including: a receiving unit, configured to receive first control information sent by a base station device, where the first control information is used to control repeated transmission of multicast service data; and a processing unit, configured to determine a repeated transmission parameter for the multicast service data according to the first control information received by the receiving unit; where the receiving unit is further configured to receive, according to the repeated transmission parameter that is for the multicast service data and is determined by the determining unit, the multicast service data sent by the base station device.

With reference to the fourth aspect, in a possible implementation, the receiving unit is further configured to receive system information sent by the base station device, where the system information is used to control repeated transmission of the first control information.

With reference to the fourth aspect and the foregoing possible implementation, in another possible implementation, the receiving unit is further configured to receive second control information sent by the base station device, where the second control information is used to control repeated transmission of the first control information.

With reference to the fourth aspect and the foregoing possible implementation, in another possible implementation, the receiving unit is further configured to receive system information sent by the base station device, where the system information is used to control repeated transmission of the second control information, and/or the system information is used to control repeated transmission of the first control information.

With reference to the fourth aspect and the foregoing possible implementation, in another possible implementation, the receiving unit is further configured to receive third control information sent by the base station device, where the third control information is used to control repeated transmission of the multicast service data.

With reference to the fourth aspect and the foregoing possible implementation, in another possible implementation, the first control information received by the receiving unit is specifically used to control repeated transmission of the third control information; or the first control information received by the receiving unit is further used to control repeated transmission of the third control information.

With reference to the fourth aspect and the foregoing possible implementation, in another possible implementation, the receiving unit is further configured to receive a change notification sent by the base station device, where the change notification is used to notify that the first control information changes, and the change notification carries a first radio network temporary identity RNTI.

With reference to the fourth aspect and the foregoing possible implementation, in another possible implementation, the receiving unit is further configured to receive system information sent by the base station device, where the system information is used to control repeated transmission of the change notification.

With reference to the fourth aspect and the foregoing possible implementation, in another possible implementation, the first control information received by the receiving unit includes a first configuration parameter; and the first configuration parameter includes at least one of the following: a first offset, a first scheduling period, a first start time, a first repetition quantity, a first repetition pattern, a modulation and coding scheme MCS, a transport block size TBS, a session identity session ID, a temporary mobile group identity TMGI, and first frequency information, where the first scheduling period is used to determine a system frame number and a start subframe number for transmitting the multicast service data or sending the third control information, or the first offset and the first scheduling period are used to determine a system frame number and a start subframe number for transmitting the multicast service data or sending the third control information, and the first start time is used to determine a first start symbol for transmitting the multicast service data or sending the third control information; or the first configuration parameter includes at least one of the following: a first offset, a first scheduling period, a first start time, a first end time, a first repetition quantity, a first repetition pattern, an MCS, a TBS, a session ID, a TMGI, and first frequency information, where the first scheduling period is used to determine a system frame number for transmitting the multicast service data or sending the third control information, or the first offset and the first scheduling period are used to determine a system frame number for transmitting the multicast service data or sending the third control information, and the first start time is used to determine a first start subframe number and/or a first start symbol for transmitting the multicast service data or sending the third control information, where the first end time includes a first end subframe number and/or a first end symbol, the first frequency information is used to indicate a frequency for sending the multicast service data or sending the third control information, and the first frequency information includes at least one of the following: a narrow band center frequency and a narrow band index value.

With reference to the fourth aspect and the foregoing possible implementation, in another possible implementation, the third control information received by the receiving unit includes a first configuration parameter, and the first configuration parameter includes at least one of the following: a first offset, a first repetition quantity, a first repetition pattern, an MCS, a TBS, and first frequency information, where the first offset is an offset used to indicate that a start time of the multicast service data is later than a start time or an end time of the third control information, the start time is a start subframe number or a start system frame number, the end time is an end subframe number or an end system frame number, the first frequency information is used to indicate a frequency for sending the multicast service data, and the first frequency information includes at least one of the following: a narrow band center frequency and a narrow band index value.

With reference to the fourth aspect and the foregoing possible implementation, in another possible implementation, the system information received by the receiving unit includes a second configuration parameter; and the second configuration parameter includes at least one of the following: a second offset, a second scheduling period, a second start time, a second repetition quantity, a second repetition pattern, and second frequency information, where the second scheduling period is used to determine a system frame number and a start subframe number for transmitting the change notification, or the second offset and the second scheduling period are used to determine a system frame number and a start subframe number for transmitting the change notification, and the second start time is used to determine a second start symbol for transmitting the change notification; or the second configuration parameter includes at least one of the following: a second offset, a second scheduling period, a second start time, a second end time, a second repetition quantity, a second repetition pattern, and second frequency information, where the second scheduling period is used to determine a system frame number for transmitting the change notification, or the second offset and the second scheduling period are used to determine a system frame number for transmitting the change notification, and the second start time is used to determine a second start subframe number and/or a second start symbol for transmitting the change notification, where the second end time includes a second end subframe number and/or a second end symbol, the second frequency information is used to indicate a frequency for sending the change notification, and the second frequency information includes at least one of the following: a narrow band center frequency and a narrow band index value.

With reference to the fourth aspect and the foregoing possible implementation, in another possible implementation, the second control information received by the receiving unit is scrambled by using a first RNTI or a second RNTI, where the first RNTI is used to scramble the second control information when the first control information changes, the first RNTI is further used to indicate that the first control information changes, and the second RNTI is used to scramble the second control information when the first control information does not change; or the second control information is further used to notify that the first control information changes.

With reference to the fourth aspect and the foregoing possible implementation, in another possible implementation, the system information received by the receiving unit includes a third configuration parameter; and the third configuration parameter includes at least one of the following: a third offset, a third scheduling period, a third start time, a third repetition quantity, a third repetition pattern, and third frequency information, where the third scheduling period is used to determine a system frame number and a start subframe number for transmitting the second control information, or the third offset and the third scheduling period are used to determine a system frame number and a start subframe number for transmitting the second control information, and the third start time is used to determine a third start symbol for transmitting the second control information; or the third configuration parameter includes at least one of the following: a third offset, a third scheduling period, a third start time, a third end time, a third repetition quantity, a third repetition pattern, and third frequency information, where the third scheduling period is used to determine a system frame number for transmitting the second control information, or the third offset and the third scheduling period are used to determine a system frame number for transmitting the second control information, and the third start time is used to determine a third start subframe number and/or a third start symbol for transmitting the second control information, where the third end time includes a third end subframe number and/or a third end symbol, the third frequency information is used to indicate a frequency for sending the second control information, and the third frequency information includes at least one of the following: a narrow band center frequency and a narrow band index value.

With reference to the fourth aspect and the foregoing possible implementation, in another possible implementation, the system information received by the receiving unit includes a fourth configuration parameter; and when the first control information does not require segment transmission, the fourth configuration parameter includes at least one of the following: a fourth offset, a fourth scheduling period, a fourth start time, a fourth repetition quantity, a fourth repetition pattern, an MCS, a TBS, and fourth frequency information, where the fourth scheduling period is used to determine a system frame number and a start subframe number for transmitting the first control information, or the fourth offset and the fourth scheduling period are used to determine a system frame number and a start subframe number for transmitting the first control information, and the fourth start time is used to determine a fourth start symbol for transmitting the first control information; or the fourth configuration parameter includes at least one of the following: a fourth offset, a fourth scheduling period, a fourth start time, a fourth end time, a fourth repetition quantity, a fourth repetition pattern, an MCS, a TBS, and fourth frequency information, where the fourth scheduling period is used to determine a system frame number for transmitting the first control information, or the fourth offset and the fourth scheduling period are used to determine a system frame number for transmitting the first control information, and the fourth start time is used to determine a fourth start subframe number and/or a fourth start symbol for transmitting the first control information, where the fourth end time includes a fourth end subframe number and/or a fourth end symbol, the fourth frequency information is used to indicate a frequency for sending the first control information, and the fourth frequency information includes at least one of the following: a narrow band center frequency and a narrow band index value; or when the first control information requires segment transmission, the fourth configuration parameter further includes at least one of the following: a segment quantity and a repetition mode, where the repetition mode is: alternately transmitting different segment information; or after repeated transmission of current segment information is complete, repeatedly transmitting next segment information.

With reference to the fourth aspect and the foregoing possible implementation, in another possible implementation, the second control information received by the receiving unit includes a fourth configuration parameter; and when the first control information does not require segment transmission, the fourth configuration parameter includes at least one of the following: a fourth offset, a fourth scheduling period, a fourth start time, a fourth repetition quantity, a fourth repetition pattern, an MCS, a TBS, and fourth frequency information; or the fourth configuration parameter includes at least one of the following: a fourth offset, a fourth scheduling period, a fourth start time, a fourth end time, a fourth repetition quantity, a fourth repetition pattern, an MCS, a TBS, and fourth frequency information; or when the first control information requires segment transmission, the fourth configuration parameter further includes at least one of the following: a segment quantity and a repetition mode.

With reference to the fourth aspect and the foregoing possible implementation, in another possible implementation, the first control information received by the receiving unit includes a fifth configuration parameter; and the fifth configuration parameter includes at least one of the following: a fifth offset, a fifth scheduling period, a fifth start time, a fifth repetition quantity, a fifth repetition pattern, and fifth frequency information, where the fifth offset is an offset used to indicate that a start time of the third control information is later than a start time or an end time of the first control information, or the fifth scheduling period is used to determine a system frame number and a start subframe number for transmitting the third control information, or the fifth offset and the fifth scheduling period are used to determine a system frame number and a start subframe number for transmitting the third control information, and the fifth start time is used to determine a fifth start symbol for transmitting the third control information; or the fifth configuration parameter includes at least one of the following: a fifth offset, a fifth scheduling period, a fifth start time, a fifth end time, a fifth repetition quantity, a fifth repetition pattern, and fifth frequency information, where the fifth offset is an offset used to indicate that a start time of the third control information is later than a start time or an end time of the first control information, or the fifth scheduling period is used to determine a system frame number for transmitting the third control information, or the fifth offset and the fifth scheduling period are used to determine a system frame number for transmitting the third control information, and the fifth start time is used to determine a fifth start subframe number and/or a fifth start symbol for transmitting the third control information, where the fifth end time includes a fifth end subframe number and/or a fifth end symbol, the fifth frequency information is used to indicate a frequency for sending the third control information, and the fifth frequency information includes at least one of the following: a narrow band center frequency and a narrow band index value.

For specific implementations, refer to actions and functions of the terminal device in the data transmission method provided by the second aspect or the possible implementations of the second aspect. Details are not further described herein.

According to a fifth aspect, an embodiment of the present invention provides a base station device, including a processor, a memory, and a transceiver, where the memory is configured to store a computer-executable instruction, and when the base station device runs, the processor executes the computer-executable instruction stored in the memory, so that the base station device performs the data transmission method according to any one of the first aspect or the possible implementations of the first aspect.

According to a sixth aspect, an embodiment of the present invention provides a terminal device, including a processor, a memory, and a transceiver, where the memory is configured to store a computer-executable instruction, and when the terminal device runs, the processor executes the computer-executable instruction stored in the memory, so that the terminal device performs the data transmission method according to any one of the second aspect or the possible implementations of the second aspect.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
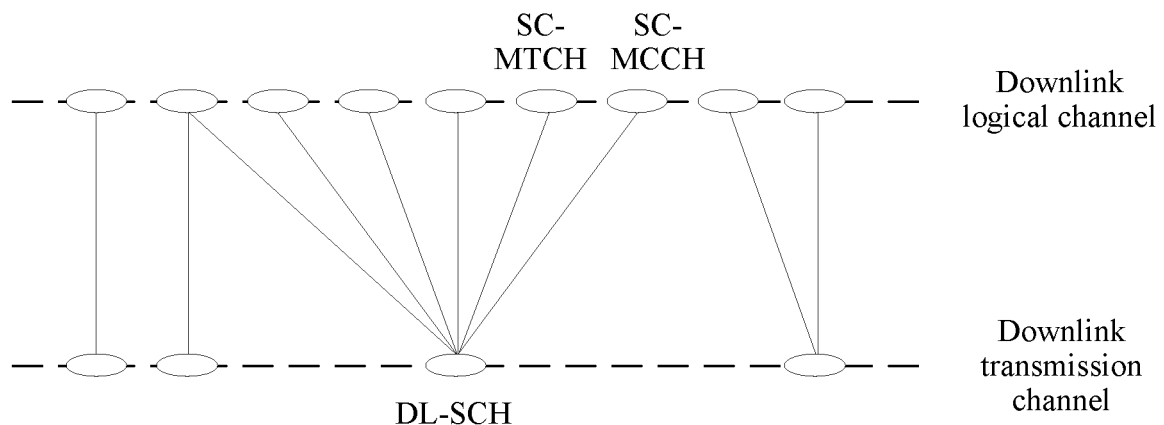
FIG. 1 is a schematic diagram of channel composition in an SC-PTM technology according to the prior art.

To reduce resource consumption of a base station in MTC and mitigate network load, an SC-PTM technology needs to be introduced in MTC. The SC-PTM technology is a technology that uses a shared resource to transmit same data to a plurality of MTC terminals simultaneously. In this technology, a shared communications link is established between the base station and a group of MTC terminals receiving a same piece of multicast service data, that is, a downlink transmission channel is shared. Specifically, as shown in FIG. 1, in the SC-PTM technology, there are a control channel, that is, a single cell multicast control channel (SC-MCCH), and a data channel, that is, a single cell multicast traffic channel (SC-MTCH). Both the two channels are mapped to a downlink shared channel (DL-SCH). Therefore, when the base station needs to deliver multicast service data, the base station may first send control information to all the MTC terminals in the group by using the SC-MCCH (where the control information may include an identity of the multicast service data and a time for sending the multicast service data), and then send the multicast service data to all the MTC terminals in the group by using the SC-MTCH, thereby reducing resource consumption of the base station and mitigating network load. However, currently the following problem exists: Even if the SC-PTM technology introduced can reduce resource consumption of the base station and mitigate network load, the SC-PTM technology currently does not support a coverage enhancement technology. Therefore, when the SC-PTM technology is directly introduced in MTC, a success rate of receiving data by an MTC terminal is still relatively low. To increase a success rate of receiving data by an MTC terminal, an embodiment of the present invention provides a data transmission method, and a basic principle thereof is as follows: A base station device sends, to a terminal device, first control information used to control repeated transmission of multicast service data, and sends the multicast service data to the terminal device according to the first control information, so that the terminal device can receive, according to the received first control information, the multicast service data repeatedly sent by the base station device. Therefore, a success rate of receiving the multicast service data by the terminal device is increased. Therefore, in MTC in which the SC-PTM technology is introduced, an MTC terminal can receive, according to received first control information, multicast service data repeatedly sent by a base station, and a success rate of receiving data by the MTC terminal is increased.

It should be noted that, the repeated transmission in this embodiment of the present invention refers to repeatedly sending information.

The following describes the implementations of the present invention in detail with reference to accompanying drawings.

Figure 2:
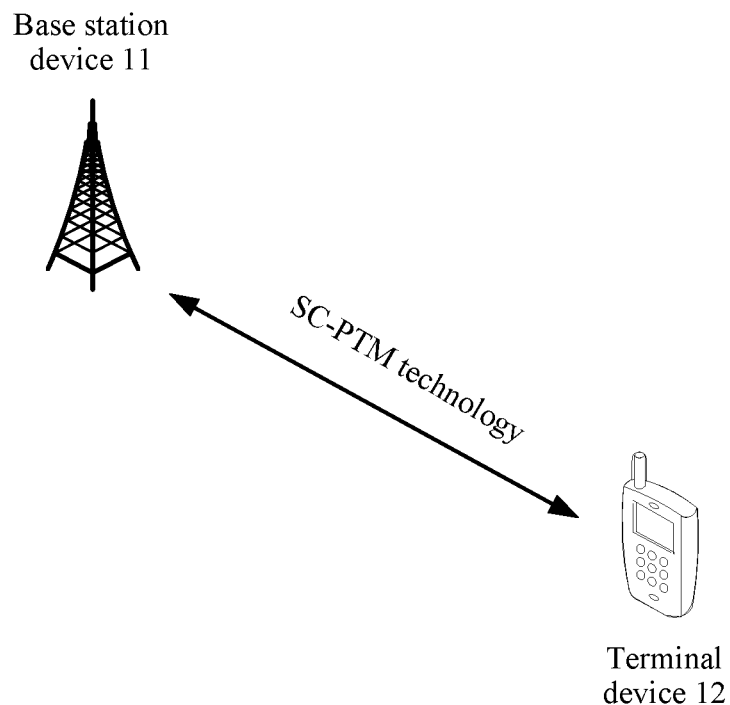
FIG. 2 is a schematic diagram of a system architecture to which the present invention is applied according to an embodiment of the present invention.

As shown in FIG. 2, FIG. 2 is a simplified schematic diagram of a system architecture to which the present invention may be applied. The system architecture may include a base station device 11 and a terminal device 12.

The base station device 11 may be a base station (BS), a base station controller, or the like in wireless communication. The base station device 11 is an apparatus deployed in a radio access network and configured to provide a wireless communication function for the terminal device. Main functions of the base station device 11 are: managing radio resources, compressing an Internet Protocol (Internet Protocol, IP) header, encrypting a user data stream, selecting a mobility management entity (MME) when user equipment is attached to the base station device 11, routing user plane data to a serving gateway (SGW), organizing and sending a paging message, organizing and sending a broadcast message, performing measurement for an objective of mobility or scheduling, configuring a measurement report, and the like. The base station may include macro base stations, micro base stations, relay stations, access points, or the like in various forms. In systems using different radio access technologies, a name of a device having functions of a base station may vary. For example, the device is referred to as an evolved NodeB (evolved NodeB, eNB or eNodeB) in a Long Term Evolution (LTE) system, or referred to as a NodeB (NodeB) in a third-generation mobile communications technology (3G) system. As the communications technology evolves, the name "base station" may vary. In addition, in other possible cases, the base station device 11 may also be an access point (AP), or another apparatus providing a wireless communication function for the terminal device. For ease of description, in this embodiment of the present invention, the apparatus providing the wireless communication function for the terminal device is referred to as the base station device 11. In a specific implementation, in an embodiment, as shown in FIG. 2, the base station device 11 is a base station.

The terminal device 12 may be an MTC terminal, and may specifically include various handheld devices (such as a mobile phone, an intelligent terminal, a multimedia device, or a streaming device) having a wireless communication function, an in-vehicle device, a wearable device, a computing device, or another processing device connected to a wireless modem, and user equipment (UE) in various forms, a mobile station (MS), a terminal device, a smart electricity meter, a smart water meter, an intelligent street lamp, a smart appliance, or the like. For ease of description, the device mentioned above is referred to as the terminal device 12. In a specific implementation, in an embodiment, as shown in FIG. 2, the terminal device 12 is user equipment.

Figure 3:
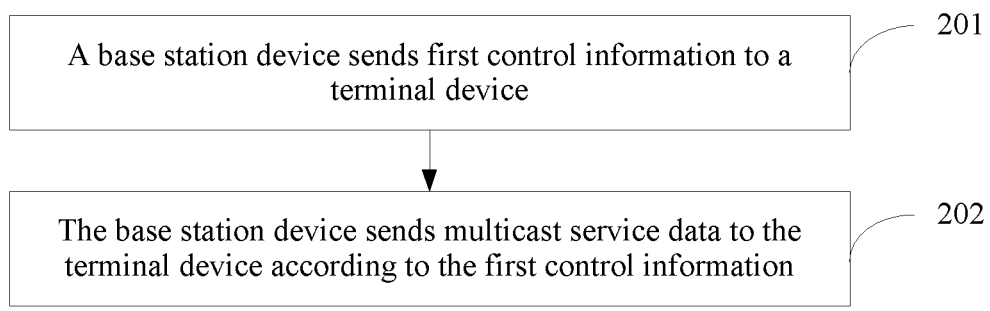
FIG. 3 is a flowchart of a data transmission method according to an embodiment of the present invention.

FIG. 3 is a flowchart of a data transmission method according to an embodiment of the present invention. As shown in FIG. 3, the method may include the following steps.

201. A base station device sends first control information to a terminal device.

The first control information is used to control repeated transmission of multicast service data.

202. The base station device sends multicast service data to the terminal device according to the first control information.

Specifically, to increase a success rate of receiving the multicast service data by the terminal device in MTC in which an SC-PTM technology is introduced, the base station device may first send, to the terminal device by using an SC-MCCH, the first control information used to control repeated transmission of the multicast service data, and after the base station device sends the first control information to the terminal device, repeatedly send the multicast service data to the terminal device according to the first control information by using an SC-MTCH, so that the terminal device can receive, according to the received first control information, the multicast service data repeatedly sent by the base station device. Therefore, the success rate of receiving the multicast service data is increased.

In the data transmission method provided by the present invention, the base station device sends, to the terminal device, the first control information used to control repeated transmission of the multicast service data, and repeatedly sends the multicast service data to the terminal device according to the first control information, so that the terminal device can receive, according to the received first control information, the multicast service data repeatedly sent by the base station device. Therefore, the success rate of receiving the multicast service data by the terminal device is increased. Therefore, in MTC in which the SC-PTM technology is introduced, an MTC terminal can receive, according to received first control information, multicast service data repeatedly sent by a base station, and a success rate of receiving data by the MTC terminal is increased.

In this embodiment of the present invention, to further increase the success rate of receiving the multicast service data by the terminal device, the first control information used to control repeated transmission of the multicast service data may also be transmitted repeatedly. In a first possible implementation, specifically, before performing step 201, the base station device may further send, to the terminal device, system information used to control repeated transmission of the first control information. In addition, step 201 may be specifically: the base station device sends the first control information to the terminal device according to the system information. In a second possible implementation, specifically, before performing step 201, the base station device may further send, to the terminal device, second control information used to control repeated transmission of the first control information. In addition, step 201 may be specifically: the base station device sends the first control information to the terminal device according to the second control information. The base station device may send the second control information to the terminal device by using a first physical downlink control channel (PDCCH) (the first PDCCH is a PDCCH corresponding to the SC-MCCH). The second control information may also be carried on a first machine type communication physical downlink control channel (MTC-PDCCH, MPDCCH).

In this embodiment of the present invention, further, on a basis of the second possible implementation of repeatedly transmitting the first control information, the success rate of receiving the multicast service data by the terminal device may be further increased by repeated transmission of the second control information. Specifically, before the base station device sends the second control information to the terminal device, the base station device may further send, to the terminal device, system information used to control repeated transmission of the second control information. In addition, that the base station device sends the second control information to the terminal device may be specifically: the base station device sends the second control information to the terminal device according to the system information. In addition, in a possible implementation, the system information may further include some parameters used to control repeated transmission of the first control information, that is, the system information may be further used to control repeated transmission of the first control information.

In this embodiment of the present invention, further, some parameters used to control repeated transmission of the multicast service data may be included in scheduling information of the multicast service data, that is, in third control information. Specifically, before performing step 202, the base station device may further send, to the terminal device, third control information used to control repeated transmission of the multicast service data. In addition, step 202 may be specifically: the base station device sends the multicast service data to the terminal device according to the first control information and the third control information. The base station device may send the third control information to the terminal device by using a second PDCCH (the second PDCCH is a PDCCH corresponding to the SC-MTCH). The third control information may also be carried on a second MPDCCH.

In this embodiment of the present invention, further, the success rate of receiving the multicast service data by the terminal device may be further increased by repeated transmission of the third control information. In a third possible implementation, the first control information sent by the base station device to the terminal device in step 201 is further used to control repeated transmission of the third control information. In addition, that the base station device sends the third control information to the terminal device may be specifically: the base station device sends the third control information to the terminal device according to the first control information. In a fourth possible implementation, specifically, parameters used to control repeated transmission of the multicast service data may be included in the third control information. In addition, the first control information sent by the base station device to the terminal device in step 201 is specifically used to control repeated transmission of the third control information. In addition, that the base station device sends the third control information to the terminal device may be specifically: the base station device sends the third control information to the terminal device according to the first control information. In addition, step 202 may be specifically sending the multicast service data to the terminal device according to the third control information.

In this embodiment of the present invention, further, when the first control information changes, to instruct the terminal device to receive the first control information again, before performing step 201, the base station device may further send, to the terminal device, a change notification carrying a first RNTI and used to notify that the first control information changes. The base station device may send the change notification to the terminal device by using a third PDCCH. The change notification may also be sent by using a third MPDCCH.

In this embodiment of the present invention, further, the success rate of receiving the multicast service data by the terminal device may be further increased by repeated transmission of the change notification. Specifically, before the base station device sends the change notification to the terminal device, the base station device may further send, to the terminal device, system information used to control repeated transmission of the change notification. In addition, that the base station device sends the change notification to the terminal device may be specifically: the base station device sends the change notification to the terminal device according to the system information.

Figure 4:
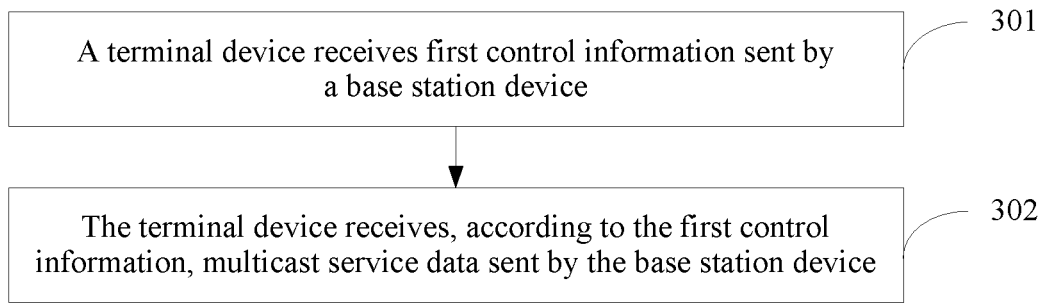
FIG. 4 is a flowchart of another data transmission method according to an embodiment of the present invention.

FIG. 4 is a flowchart of another data transmission method according to an embodiment of the present invention. As shown in FIG. 4, the method may include the following steps.

301. A terminal device receives first control information sent by a base station device.

The first control information is used to control repeated transmission of multicast service data.

302. The terminal device receives, according to the first control information, multicast service data sent by the base station device.

Specifically, to increase a success rate of receiving the multicast service data by the terminal device in MTC in which an SC-PTM technology is introduced, the base station device sends, to the terminal device, the first control information used to control repeated transmission of the multicast service data, and repeatedly sends the multicast service data to the terminal device according to the first control information. Therefore, the terminal device can receive, by using an SC-MCCH, the first control information sent by the base station device, and further receive, according to the received first control information by using an SC-MTCH, the multicast service data repeatedly sent by the base station device. Therefore, the success rate of receiving the multicast service data is increased.

In the data transmission method provided by the present invention, the terminal device receives the first control information sent by the base station device and used to control repeated transmission of the multicast service data, so that the terminal device can receive, according to the first control information, the multicast service data repeatedly sent by the base station device. Therefore, the success rate of receiving the multicast service data by the terminal device is increased. Therefore, in MTC in which the SC-PTM technology is introduced, an MTC terminal can receive, according to received first control information, multicast service data repeatedly sent by a base station, and a success rate of receiving data by the MTC terminal is increased.

In this embodiment of the present invention, further, to further increase the success rate of receiving the multicast service data by the terminal device, the base station device also repeatedly transmits the first control information used to control repeated transmission of the multicast service data. In a first possible implementation, the base station device controls repeated transmission of the first control information by using system information. In this case, correspondingly, before performing step 301, the terminal device receives system information sent by the base station device and used to control repeated transmission of the first control information. In addition, step 301 may be specifically: the terminal device receives, according to the system information, the first control information sent by the base station device. In a second possible implementation, the base station device controls repeated transmission of the first control information by using second control information. In this case, correspondingly, before performing step 301, the terminal device receives second control information sent by the base station device and used to control repeated transmission of the first control information. In addition, step 301 may be specifically: the terminal device receives, according to the second control information, the first control information sent by the base station device. The terminal device may receive, by using a first PDCCH or a first MPDCCH, the second control information sent by the base station device.

In this embodiment of the present invention, further, on a basis of the second possible implementation of performing repeated transmission of the first control information by the base station device, the base station device also repeatedly transmits the second control information to further increase the success rate of receiving the multicast service data by the terminal device. In this case, correspondingly, before the terminal device receives the second control information sent by the base station device, the terminal device may further receive system information sent by the base station device and used to control repeated transmission of the second control information. In addition, that the terminal device receives the second control information sent by the base station device may be specifically: the terminal device receives, according to the system information, the second control information sent by the base station device. In addition, in a possible implementation, the system information may further include some parameters used to control repeated transmission of the first control information, that is,
the system information may be further used to control repeated transmission of the first control information.

In this embodiment of the present invention, further, when the base station device includes some parameters used to control repeated transmission of the multicast service data into scheduling information of the multicast service data, that is, third control information, correspondingly, before performing step 302, the terminal device may further receive third control information sent by the base station device and used to control repeated transmission of the multicast service data. In addition, step 302 may be specifically: the terminal device receives, according to the first control information and the third control information, the multicast service data sent by the base station device. The terminal device may receive, by using a second PDCCH or a second MPDCCH, the third control information sent by the base station device.

In this embodiment of the present invention, further, to further increase the success rate of receiving the multicast service data by the terminal device, the base station device also repeatedly transmits the third control information. In a first possible implementation, the base station device controls repeated transmission of the third control information by using the first control information. In this case, correspondingly, that the terminal device receives the third control information sent by the base station device may be specifically: the terminal device receives, according to the first control information, the third control information sent by the base station. In a second possible implementation, the base station device controls repeated transmission of the multicast service data by using the third control information, and controls repeated transmission of the third control information by using the first control information. In this case, correspondingly, that the terminal device receives the third control information sent by the base station device may be specifically: the terminal device receives, according to the first control information, the third control information sent by the base station device, and step 302 may be specifically: the terminal device receives, according to the third control information, the multicast service data sent by the base station device.

In this embodiment of the present invention, further, when the first control information changes, the base station device needs to instruct the terminal device to receive the first control information again. In this case, correspondingly, before performing step 301, the terminal device may further receive a change notification sent by the base station device, where the change notification carries a first RNTI and is used to notify that the first control information changes. The terminal device may receive, by using a third PDCCH or a third MPDCCH, the change notification sent by the base station device.

In this embodiment of the present invention, further, when the base station device repeatedly transmits the change notification to further increase the success rate of receiving the multicast service data by the terminal device, correspondingly, before the terminal device receives the change notification sent by the base station device, the terminal device may further receive system information sent by the base station device and used to control repeated transmission of the change notification. In addition, that the terminal device receives the change notification sent by the base station device may be specifically: the terminal device receives, according to the system information, the change notification sent by the base station device.

Figure 5:
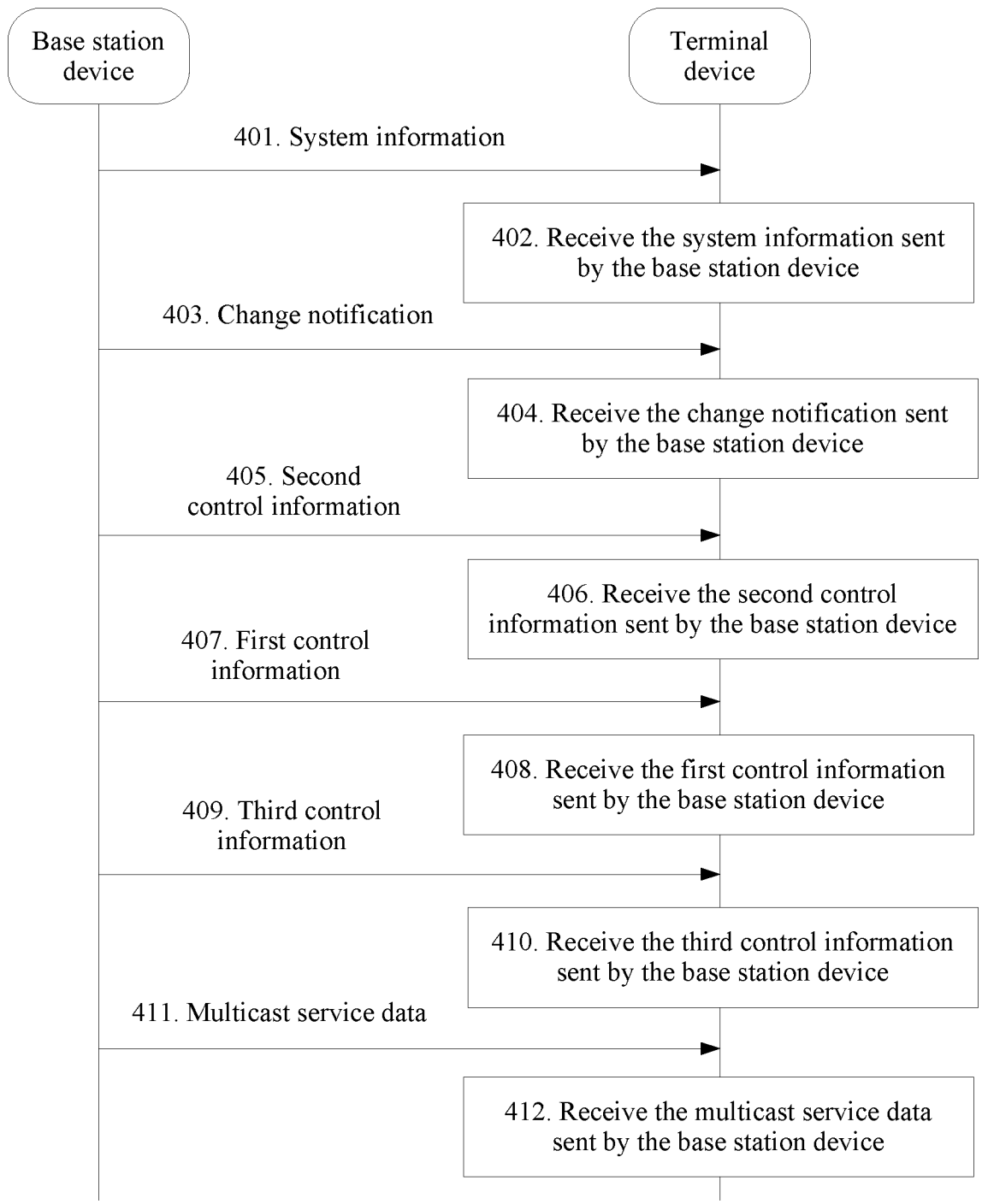
FIG. 5 is a flowchart of another data transmission method according to an embodiment of the present invention.

FIG. 5 is a flowchart of another data transmission method according to an embodiment of the present invention. As shown in FIG. 5, the method may include the following steps.

To increase a success rate of receiving data by a terminal device in MTC in which an SC-PTM technology is introduced, an embodiment of the present invention provides a data transmission method. For ease of understanding by a person skilled in the art, the following describes in detail a general process of receiving multicast service data by a terminal device.

401. A base station device sends system information to a terminal device.

The system information may include configuration information required by the terminal device for completing reception of multicast service data.

402. The terminal device receives the system information sent by the base station device.

403. The base station device sends a change notification to the terminal device.

The change notification is used to notify that first control information changes, and the change notification carries a first RNTI. In essence, the carrying is scrambling, by using the first RNTI, a third PDCCH or a third MPDCCH on which the change notification is sent. When information used to control repeated transmission of the multicast service data, that is, the first control information, changes, the base station device may send the change notification to the terminal device, to instruct the terminal device to obtain the first control information again and further obtain the multicast service data again. Herein it should be noted that, generally, the change notification is not sent every time any information in the first control information changes. The change notification may be sent only when some information in the first control information changes. For example, the change notification is sent when multicast service data type information carried in the first control information changes, but the change notification is not sent when other information changes. Alternatively, for example, the change notification is sent when only a new multicast service type is added to the first control information, but the change notification is not sent in other cases. Certainly, if the information used to control repeated transmission of the multicast service data, that is, the first control information, does not change, there is no need to perform step 403, but the terminal device still needs to blindly detect the third PDCCH or the third MPDCCH on which the change notification is sent, to determine whether the change notification exists.

Further, to increase a success rate of receiving the multicast service data by the terminal device, the base station device may repeatedly send the change notification to the terminal device, and may control repeated transmission of the change notification by using system information. Specifically, when the system information is used to control repeated transmission of the change notification, the base station device may send the change notification to the terminal device according to the system information. The system information may include a second configuration parameter used to control repeated transmission of the change notification. The second configuration parameter may include at least one of the following: a second offset, a second scheduling period, a second start time, a second end time, a second repetition quantity, a second repetition pattern, and second frequency information.

Figure 6A:
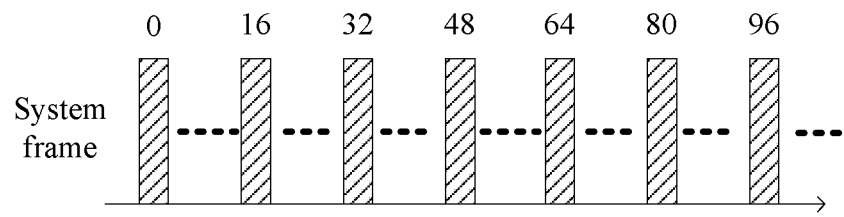
FIG. 6A is a simplified schematic diagram of data transmission according to an embodiment of the present invention.

Parameters included in the second configuration parameter:

1. When the second scheduling period is indicated by a system frame number, the second scheduling period may be used to determine a system frame number for sending the change notification, and the system frame number is a start system frame for sending the change notification in a scheduling period. For example, as shown in FIG. 6A, the second scheduling period is 16 (unit: frame). According to a formula "SFN mod Second scheduling period=0" (the SFN is a system frame number, and mod indicates a modulo operation), system frame numbers for sending the change notification may be determined as 0, 16, 32, 48, 64, 80, 96, and so on. In other words, when the base station device needs to send the change notification, the base station device may determine, according to the second scheduling period, whether the change notification needs to be sent in a current system frame. For example, if a current system frame number is 16, it may be determined, according to the formula "SFN mod Second scheduling period=0", that the change notification needs to be sent in the current system frame 16.

Figure 6B:
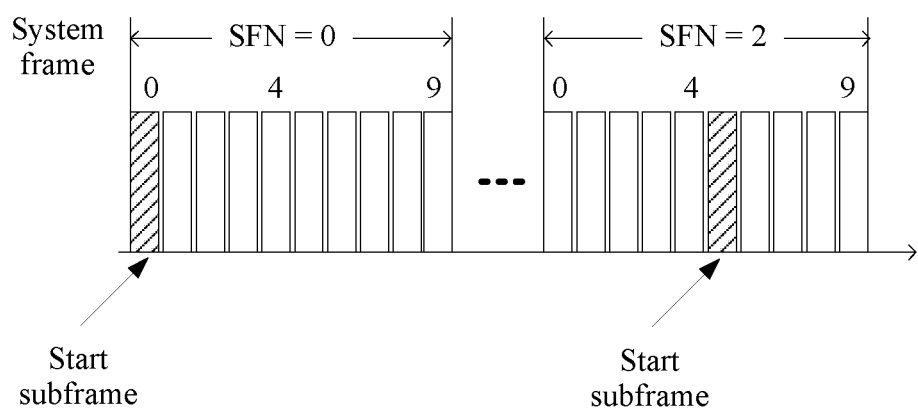
FIG. 6B is another simplified schematic diagram of data transmission according to an embodiment of the present invention.

Alternatively, when the second scheduling period is indicated by a subframe number, the second scheduling period may be used to determine a system frame number and a start subframe number for sending the change notification. For example, as shown in FIG. 6B, the second scheduling period is 25 (unit: subframe). According to a formula "(SFN*10+Subframe number) mod Second scheduling period=0", it may be determined that, system frame numbers for sending the change notification are 0, 2, and so on, and a start subframe number corresponding to the system frame 0 is 0, and a start subframe number corresponding to the system frame 2 is 5. In other words, when the base station device needs to send the change notification, the base station device may determine, according to the second scheduling period, whether the change notification needs to be sent in a current system frame, and determine in which subframe of the current system frame the change notification starts to be sent, that is, determine a start subframe number. For example, if the current system frame number is 2, according to the formula "(SFN*10+Subframe number) mod Second scheduling period=0", it may be determined that the change notification needs to be sent in the current system frame 2, and the start subframe number is 5.

Figure 6C:
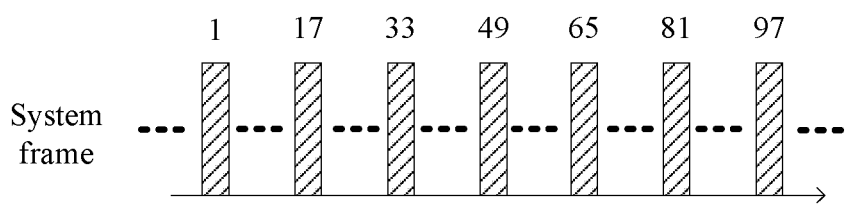
FIG. 6C is another simplified schematic diagram of data transmission according to an embodiment of the present invention.

2. When the second offset is indicated by a system frame number, the second offset and the second scheduling period may be used together to determine a system frame number for sending the change notification. For example, as shown in FIG. 6C, the second scheduling period is 16 (unit: frame), and the second offset is 1 (unit: frame). According to a formula "SFN mod Second scheduling period=Second offset" (the SFN is a system frame number, and mod indicates a modulo operation), system frame numbers for sending the change notification may be determined as 1, 17, 33, 49, 65, 81, 97, and so on. In other words, when the base station device needs to send the change notification, the base station device may determine, according to the second scheduling period and the second offset, whether the change notification needs to be sent in a current system frame. For example, if a current system frame number is 33, it may be determined, according to the formula "SFN mod Second scheduling period=Second offset", that the change notification needs to be sent in the current system frame 33.

Figure 6D:
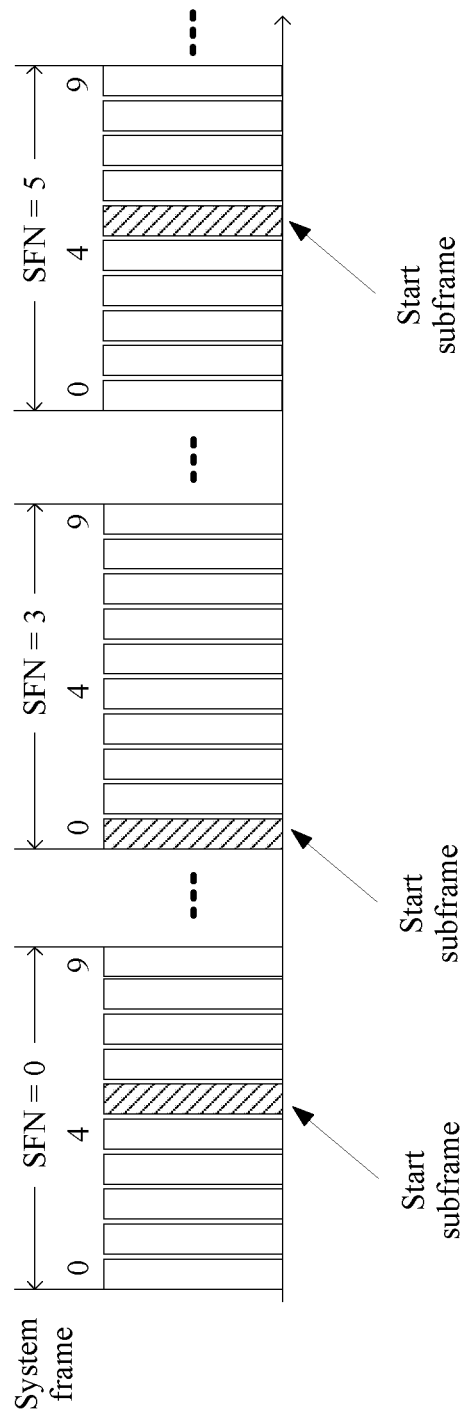
FIG. 6D is another simplified schematic diagram of data transmission according to an embodiment of the present invention.

Alternatively, when both the second scheduling period and the second offset are indicated by subframe numbers, the second scheduling period and the second offset may be used together to determine a system frame number and a start subframe number for sending the change notification. For example, as shown in FIG. 6D, the second scheduling period is 25 (unit: subframe), and the second offset is 5 (unit: subframe). According to a formula "(SFN*10+Subframe number) mod Second scheduling period=Second offset", system frame numbers for sending the change notification may be determined as 0, 3, 5, and so on. In addition, a start subframe number corresponding to the system frame 0 is 5, a start subframe number corresponding to the system frame 3 is 0, and a start subframe number corresponding to the system frame 5 is 5. In other words, when the base station device needs to send the change notification, the base station device may determine, according to the second scheduling period, whether the change notification needs to be sent in a current system frame, and determine in which subframe of the current system frame the change notification starts to be sent, that is, determine a start subframe number. For example, if the current system frame number is 3, according to the formula "(SFN*10+Subframe number) mod Second scheduling period=Second offset", it may be determined that the change notification needs to be sent in the current system frame 3, and the start subframe number is 0.

3. When only a system frame number for sending the change notification is determined, the second start time may be used to confirm a start subframe number. In this case, the second start time is used to determine a start subframe number for transmitting the change notification. In addition, the second start time may be further used to determine a start symbol for transmitting the change notification, that is, a specific symbol from which the change notification starts to be sent in a subframe for repeatedly sending the change notification every time. The second end time is a last frame position and/or a last subframe position and/or a last symbol position in a subframe, for repeatedly sending the change notification.

The system frame number for sending the change notification, the start subframe number in the system frame number, and the specific start symbol in the subframe for repeatedly sending the change notification are determined above.

Figure 6:
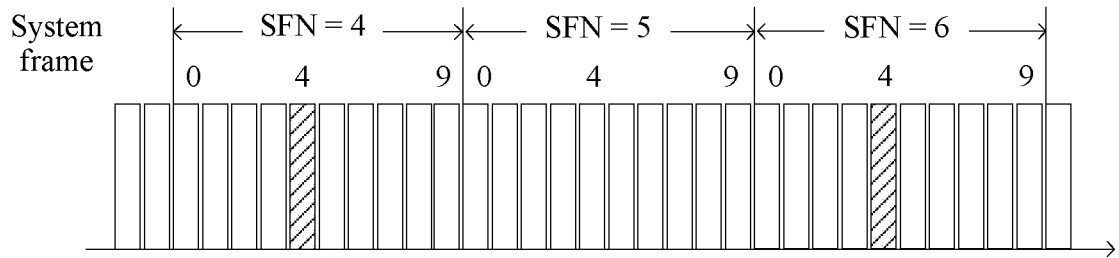
FIG. 6 is another simplified schematic diagram of data transmission according to an embodiment of the present invention.
Figure 6:
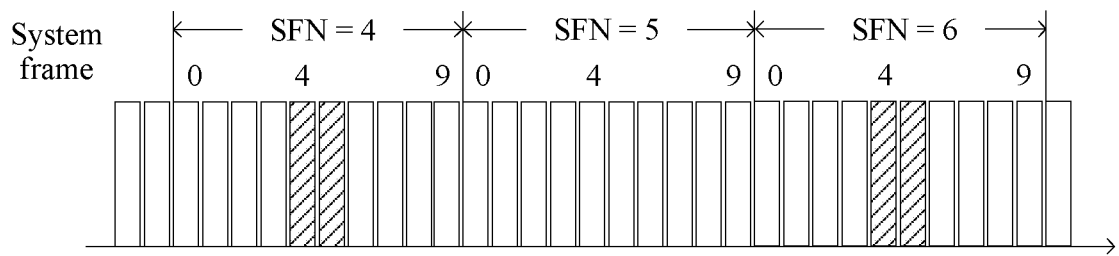
Figure 6:
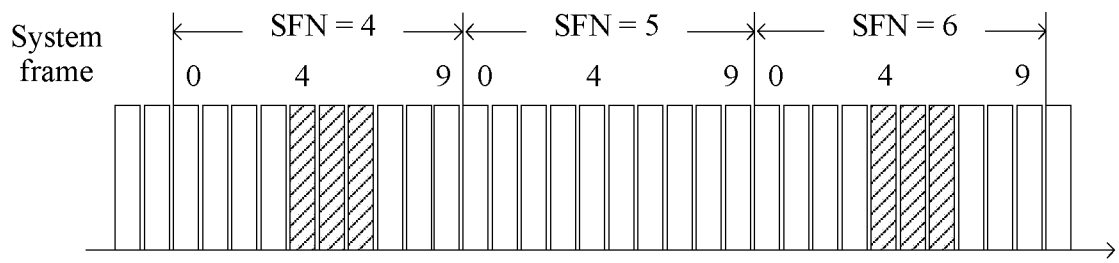

4. The second repetition quantity indicates a quantity of times that the change notification is repeatedly sent in a scheduling period, for example, 1, 2, . . . , or N, where N is an integer greater than or equal to 1. For example, as shown in FIG. 6, the second repetition quantity is 1, 2, or 3.

Figure 7:
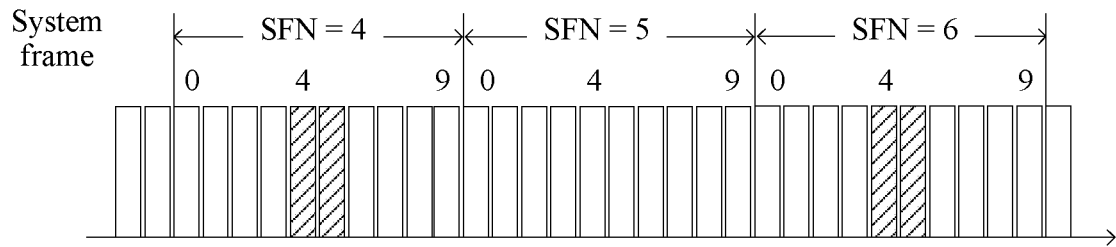
FIG. 7 is another simplified schematic diagram of data transmission according to an embodiment of the present invention.
Figure 7:
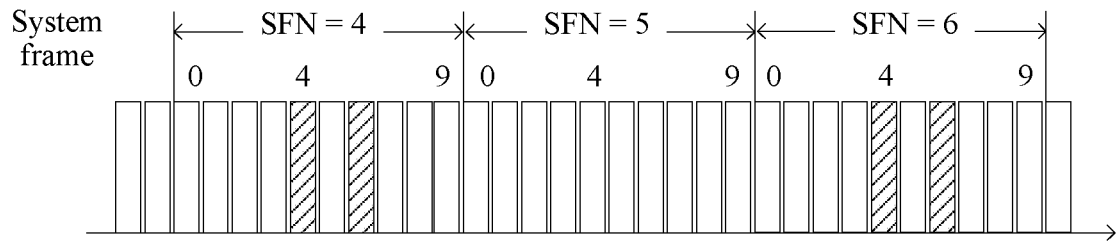
Figure 7:
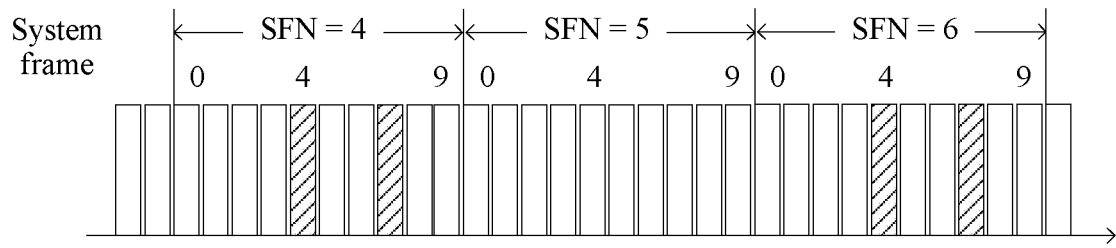
Figure 8:
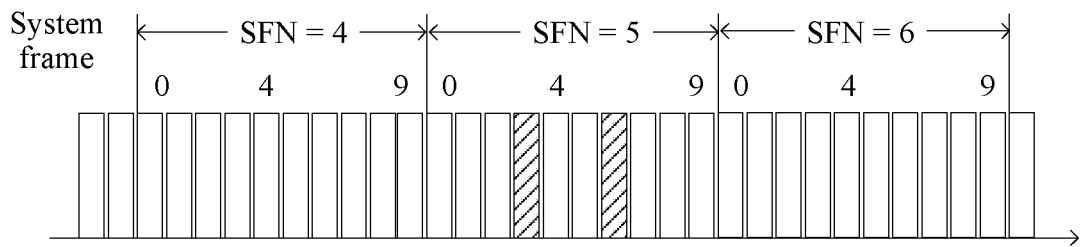
FIG. 8 is another simplified schematic diagram of data transmission according to an embodiment of the present invention.

5. The second repetition pattern indicates a pattern of repeatedly transmitting the change notification (that is, the third PDCCH or the third MPDCCH). For example, the second repetition pattern is transmitting the change notification once every subframe, transmitting the change notification once every two subframes, . . . , or transmitting the change notification once every M subframes, where M is an integer greater than or equal to 1. For example, as shown in FIG. 7, the second repetition pattern is transmitting the change notification once every subframe, transmitting the change notification once every two subframes, or transmitting the change notification once every three subframes. According to the determined system frame number, start subframe number, second repetition quantity, and second repetition pattern, subframes in which the change notification needs to be transmitted in a current system frame or a current scheduling period may be determined. For example, as shown in FIG. 8, assuming that the system frame number of the current system frame is 5, and the start subframe number is 3, and the second repetition quantity is 2, and the second repetition pattern is transmitting the change notification once every three subframes, it is determined, according to the second repetition quantity and the second repetition pattern, that the change notification needs to be transmitted in a subframe 3 and a subframe 6 in the system frame whose system frame number is 5. Herein the subframe for repeatedly transmitting the change notification (that is, the third PDCCH or the third MPDCCH) is not definitely limited to one system frame. In other words, the subframe for repeated transmission may be extended to subsequent system frames. In this way, subframes in which the change notification is repeatedly sent in the current scheduling period are determined.

Figure 8A:
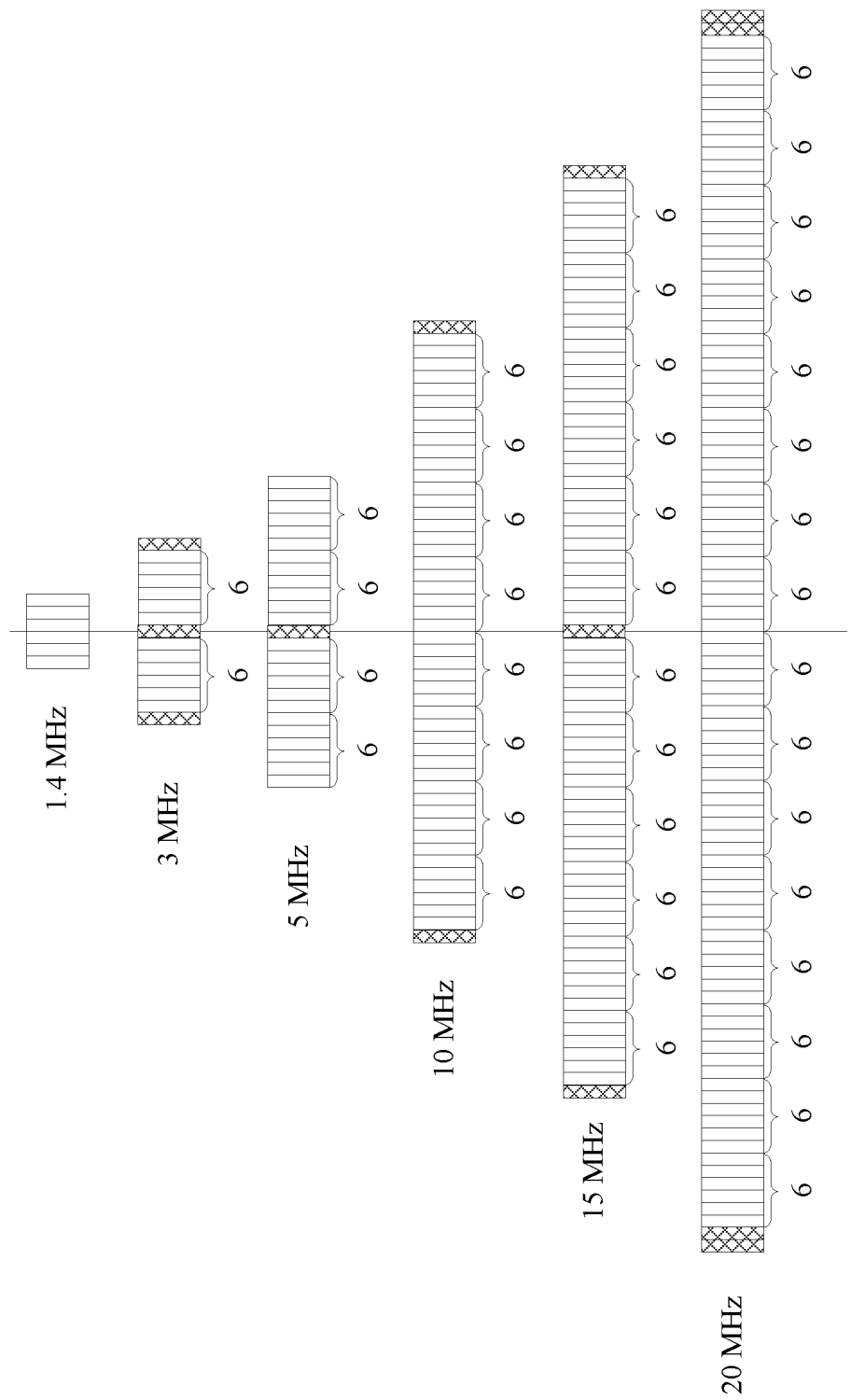
FIG. 8A is a simplified schematic diagram of system bandwidth division according to an embodiment of the present invention.

6. The second frequency information indicates information about a frequency for sending the change notification (that is, the third PDCCH or the third MPDCCH), that is, a frequency band in which the change notification is sent. In MTC, a system bandwidth is divided into a plurality of narrow bands, for example, six physical resource blocks (Physical Resource Block, PRB), corresponding to 6×180 kHz. In this case, the second frequency information indicates specific six PRBs in which the change notification is sent. The frequency information may be a specific frequency using Hz as a unit, or may be a narrow band index value (Narrow Band Index) after the system bandwidth is divided into a plurality of narrow bands. For example, as shown in FIG. 8A, each system bandwidth is divided into several groups of six PRBs. When the terminal device receives a service from a base station device, the terminal device may obtain a system bandwidth such as 10 MHz (corresponding to 50 PRBs) by using system information. In this case, the system bandwidth is divided into eight narrow bands, where a first narrow band is from a second PRB to a seventh PRB, a second narrow band is from an eighth PRB to a thirteenth PRB, and so on. In addition, in different system bandwidths, the method for division of narrow bands may vary, but all narrow bands that are obtained through division may be indexed sequentially. For example, the narrow band indexes in the foregoing example are 1, 2, . . . , and 8. Therefore, when the base station device configures a narrow band for sending the change notification, the base station device may directly notify the terminal device of a narrow band index value, that is, the second frequency information is an index value. For example, the index value is 3, and it indicates a narrow band corresponding to 3, that is, a narrow band from a fourteenth PRB to a nineteenth 19 PRB in 10 MHz (corresponding to 50 PRBs) in the system bandwidth. In this way, after receiving the second frequency information, the terminal device can receive the change notification in the specified narrow band.

It should be noted that, content specifically included in the second configuration parameter may be selected according to a requirement in an actual application scenario. This is not specifically limited in this embodiment of the present invention. In addition, if a required parameter used to control repeated transmission of the change notification is not included in the second configuration parameter, the required parameter used to control repeated transmission of the change notification may be preconfigured in the base station device and the terminal device, or may be notified to the terminal device in another manner according to a requirement in an actual application scenario. This is not specifically limited in this embodiment of the present invention.

Figure 9:
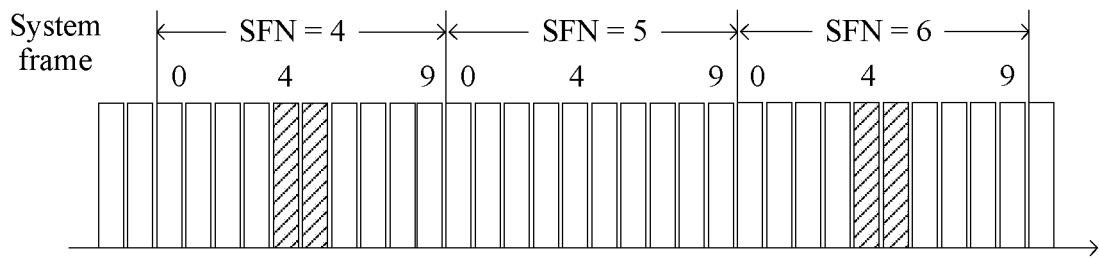
FIG. 9 is another simplified schematic diagram of data transmission according to an embodiment of the present invention.
Figure 9:
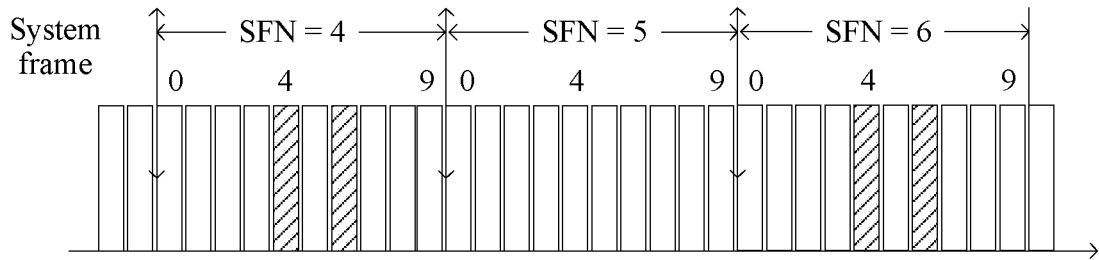
Figure 9:
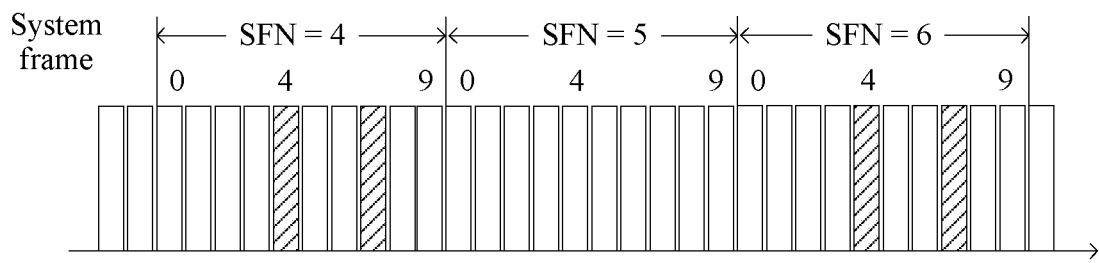
Figure 10:
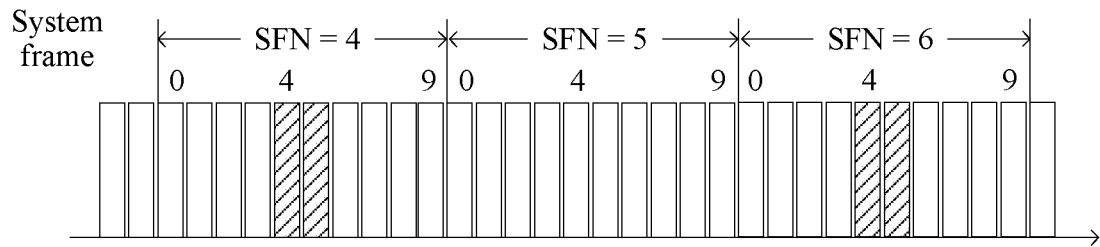
FIG. 10 is another simplified schematic diagram of data transmission according to an embodiment of the present invention.
Figure 10:
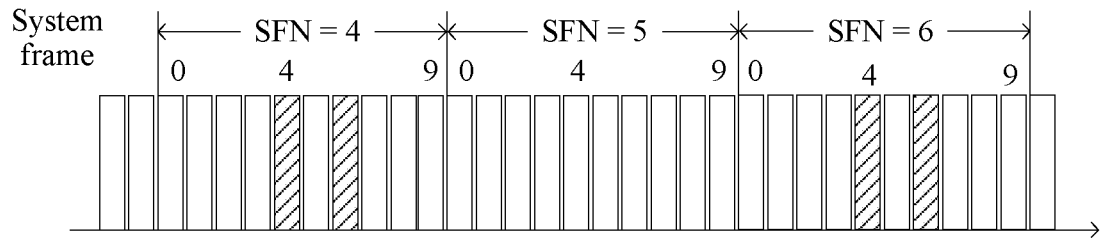
Figure 10:
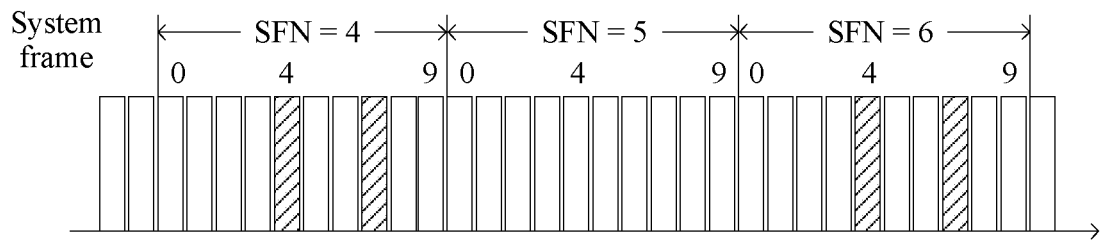

In addition, the second repetition quantity and the second repetition pattern included in the second configuration parameter may also be replaced with similar parameters, to determine subframes in which the change notification needs to be transmitted in the current system frame. For example, the second repetition pattern may be replaced with a repetition interval or a repetition period. The repetition interval is an interval between two subframes for sending the change notification. For example, the repetition interval is 0 subframe, one subframe, . . . , or X subframes, where X is an integer greater than or equal to 0. The repetition period is a period of repeatedly sending the change notification in a scheduling period. For example, the repetition period is one subframe, two subframes, . . . , or Y subframes, where Y is an integer greater than or equal to 0. For example, as shown in FIG. 9, the repetition period is 0 subframe (a corresponding repetition period is one subframe), one subframe (a corresponding repetition period is two subframes), or two subframes (a corresponding repetition period is three subframes). For another example, the second repetition quantity may also be replaced with a repetition time. The repetition time is a continuous time from sending a first change notification to sending a last change notification. For example, the repetition time is one subframe, two subframes, three subframes, . . . , or Z subframes, where Z is an integer greater than or equal to 1. For example, as shown in FIG. 10, the repetition time is two subframes, three subframes, or four subframes. According to one of the repetition interval, the repetition period, the second repetition pattern, and the repetition time, subframes in which the change notification needs to be transmitted in the current system frame may also be determined.

Figure 10A:
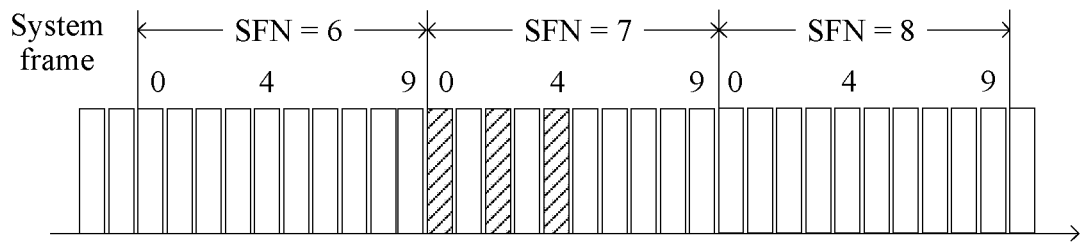
FIG. 10A is another simplified schematic diagram of data transmission according to an embodiment of the present invention.

For example, assuming that the second configuration parameter includes the second offset, the second scheduling period (both the second scheduling period and the second offset are indicated by subframe numbers), the second start time, the second repetition quantity, the second repetition pattern (Repetition Pattern), and the second frequency information, that the base station device sends the change notification to the terminal device according to the system information may be specifically: the base station device may first determine, according to the second offset and the second scheduling period, whether the current system frame is a system frame in which the change notification needs to be sent; and if determining that the current system frame is not a system frame in which the change notification needs to be sent, the base station device determines whether a system frame next to the current system frame is a system frame in which the change notification needs to be sent; or if determining that the current system frame is a system frame in which the change notification needs to be sent, the base station device determines, according to the second offset, the second scheduling period, the second start time, the second repetition quantity, and the second repetition pattern, subframes and/or symbols in which the change notification needs to be sent in the current system frame or the current scheduling period, and then sends, to the terminal device according to all the determined subframe numbers and/or symbols, and the second frequency information, the change notification carrying the first RNTI, to implement repeated sending of the change notification. For example, the second offset is 5 (unit: subframe), the second scheduling period is 25 (unit: subframe), the second repetition quantity is 3, the second repetition pattern is sending once every two subframes, and the current system frame is 7. In this case, that the base station device sends the change notification to the terminal device according to the system information may be specifically: the base station device may first determine, according to the second offset 5 and the second scheduling period 25, that the current system frame 7 is a system frame in which the change notification needs to be sent, and the base station device determines, according to the second offset 5, the second scheduling period 25, the second repetition quantity 3, and the second repetition pattern that is sending once every two subframes, that the change notification needs to be sent in a subframe 0, a subframe 2, and a subframe 4 in the current system frame 7 (as shown in FIG. 10A), and then sends, in the subframes 0, 2, and 4 of the system frame 7 according to the second frequency information, the change notification carrying the first RNTI to the terminal device, to implement repeated sending of the change notification.

The first RNTI may be specifically a single cell change notification radio network temporary identity (SC-N-RNTI). In other words, the third PDCCH or the third MPDCCH may be scrambled by using the SC-N-RNTI, to achieve an objective of notifying the terminal device that the first control information changes.

This step is optional.

404. The terminal device receives the change notification sent by the base station device.

When the terminal device is interested in the multicast service data, the terminal device directly receives the first control information (the first control information may be carried in the SC-MCCH), without blindly detecting the third PDCCH or the third MPDCCH carrying the change notification. When the received first control information includes no service of interest to the terminal device, the terminal device needs to always blindly detect the third PDCCH or the third MPDCCH on which the change notification is sent, because when a service of interest to the terminal device occurs, the first control information definitely changes, and the base station device definitely sends the change notification. Therefore, to reduce power consumption of the terminal device, the terminal device only needs to blindly detect the third PDCCH or the third MPDCCH carrying the change notification. If the terminal device detects the change notification, the terminal device reads the first control information carried in the SC-MCCH. If no service of interest is included, the terminal device continues to blindly detect the third PDCCH or the third MPDCCH; or if a service of interest is included, the terminal device receives, according to the first control information carried in the SC-MCCH, the multicast service data carried in an SC-MTCH. When receiving the multicast service data, the terminal device always receives the first control information carried in the SC-MCCH. In this case, the third PDCCH or the third MPDCCH carrying the change notification does not need to be detected.

Further, when the base station device repeatedly sends the change notification to the terminal device according to the system information, the terminal device may receive, according to the system information, the change notification repeatedly sent by the base station device. Specifically, the terminal device may receive, according to the second configuration parameter included in the system information, the change notification repeatedly sent by the base station device. Detailed descriptions about the second configuration parameter are similar to detailed descriptions about the second configuration parameter in step 403, and are not further provided herein in this embodiment of the present invention.

For example, according to the example in step 403, that the terminal device receives, according to the system information, the change notification sent by the base station device may be specifically: the terminal device may first determine, according to the second offset and the second scheduling period, or according to only the second scheduling period, whether the current system frame is a system frame in which the change notification needs to be received; and if determining that the current system frame is not a system frame in which the change notification needs to be received, the terminal device determines whether the system frame next to the current system frame is a system frame in which the change notification needs to be received; or if determining that the current system frame is a system frame in which the change notification needs to be received, the terminal device determines, according to the second offset, the second scheduling period, the second start time, the second repetition quantity, and the second repetition pattern, subframes and/or symbols in which the change notification needs to be received in the current system frame or the current scheduling period, and then receives, according to all the determined subframe numbers and/or symbols, and the second frequency information, the change notification sent by the base station device and carrying the first RNTI. Because the change notification may be received repeatedly in a plurality of subframe numbers and/or symbols, a success rate of receiving the change notification by the terminal device is increased. When the first RNTI is the SC-N-RNTI, the terminal device may descramble the third PDCCH or the third MPDCCH by using the SC-N-RNTI, and if descrambling succeeds, may determine that the first control information changes.

This step is optional.

405. The base station device sends second control information to the terminal device.

Before sending the first control information to the terminal device, the base station device may first send, to the terminal device, scheduling information of the first control information, that is, the second control information.

Further, to increase the success rate of receiving the multicast service data by the terminal device, the base station device may repeatedly send the second control information to the terminal device, and in a possible implementation, may control repeated transmission of the second control information by using system information. Specifically, when the system information is used to control repeated transmission of the second control information, the base station device may send the second control information to the terminal device according to the system information. The system information may include a third configuration parameter used to control repeated transmission of the second control information. The third configuration parameter may include at least one of the following: a third offset, a third scheduling period, a third start time, a third end time, a third repetition quantity, a third repetition pattern, and third frequency information.

In addition, the third end time is a last frame position and/or a last subframe position and/or a last symbol position in a subframe, for repeatedly sending the second control information. The third offset may further indicate an offset between a last subframe for sending the change notification message and a start subframe for sending the second control information.

It should be noted that, in this embodiment of the present invention, detailed descriptions about the third configuration parameter are similar to detailed descriptions about the second configuration parameter in step 403, and are not further provided herein in this embodiment of the present invention. In addition, content specifically included in the third configuration parameter may be selected according to a requirement in an actual application scenario. This is not specifically limited in this embodiment of the present invention. In addition, if a required parameter used to control repeated transmission of the second control information is not included in the third configuration parameter, the required parameter used to control repeated transmission of the second control information may be preconfigured in the base station device and the terminal device, or may be notified to the terminal device in another manner according to a requirement in an actual application scenario. This is not specifically limited in this embodiment of the present invention.

For example, assuming that the third configuration parameter includes the third offset, the third scheduling period (both the third scheduling period and the third offset are indicated by subframe numbers), the third start time, the third repetition quantity, the third repetition pattern, and the third frequency information, that the base station device sends the second control information to the terminal device according to the system information may be specifically: the base station device may first determine, according to the third offset and the third scheduling period, whether the current system frame is a system frame in which the second control information needs to be sent; and if determining that the current system frame is not a system frame in which the second control information needs to be sent, the base station device determines whether the system frame next to the current system frame is a system frame in which the second control information needs to be sent; or if determining that the current system frame is a system frame in which the second control information needs to be sent, the base station device determines, according to the third offset, the third scheduling period, the third start time, the third repetition quantity, and the third repetition pattern, subframes and/or symbols in which the second control information needs to be sent in the current system frame or the current scheduling period, and then sends the second control information to the terminal device according to all the determined subframe numbers and/or symbols, and the third frequency information by using a first PDCCH or a first MPDCCH, to implement repeated sending of the second control information.

In addition, in another possible implementation, the base station device may also perform repeated transmission of the second control information directly according to the subframe and/or symbol for repeatedly transmitting the change notification. That is, after sending the change notification to the terminal device, the base station device may directly send the second control information according to the determined subframe and/or symbol in which the change notification needs to be sent. In still another possible implementation, the system information may include a correction offset (the correction offset may be included in the third offset) (the correction offset is an offset of the start subframe for sending the second control information, relative to a start subframe for sending the change notification, where a unit of the correction offset may be a frame, or may be a subframe). When the unit of the correction offset is a subframe, that the base station device sends the second control information to the terminal device may be specifically: the base station device determines, according to the correction offset and the determined subframe and/or symbol in which the change notification needs to be sent, a subframe and/or symbol for sending the second control information, and then sends the second control information according to the determined subframe and/or symbol for sending the second control information. When the unit of the correction offset is a frame, that the base station device sends the second control information to the terminal device may be specifically: the base station device determines, according to the correction offset, the start subframe number, and the determined subframe and/or symbol in which the change notification needs to be sent, a subframe and/or symbol for sending the second control information, and then sends the second control information according to the determined subframe and/or symbol for sending the second control information.

This step is optional.

406. The terminal device receives the second control information sent by the base station device.

After the base station device sends the second control information to the terminal device, the terminal device may receive the second control information sent by the base station device.

Further, in a possible implementation, when the base station device repeatedly sends the second control information to the terminal device according to the system information, the terminal device may receive, according to the system information, the second control information repeatedly sent by the base station device. Specifically, the terminal device may receive, according to the third configuration parameter included in the system information, the second control information repeatedly sent by the base station device. Detailed descriptions about the third configuration parameter are similar to detailed descriptions about the third configuration parameter in step 405, and are not further provided herein in this embodiment of the present invention.

For example, according to the example in step 405, that the terminal device receives, according to the system information, the second control information sent by the base station device may be specifically: the terminal device may first determine, according to the third offset and the third scheduling period, whether the current system frame is a system frame in which the second control information needs to be received; and if determining that the current system frame is not a system frame in which the second control information needs to be received, the terminal device determines whether the system frame next to the current system frame is a system frame in which the second control information needs to be received; or if determining that the current system frame is a system frame in which the second control information needs to be received, the terminal device determines, according to the third offset, the third scheduling period, the third start time, the third repetition quantity, and the third repetition pattern, subframes and/or symbols in which the second control information needs to be received in the current system frame or the current scheduling period, and then receives, according to all the determined subframe numbers and/or symbols, and the third frequency information by using the first PDCCH or the first MPDCCH, the second control information sent by the base station device. Because the second control information may be received repeatedly in a plurality of subframe numbers and/or symbols, a success rate of receiving the second control information is increased.

In addition, in another possible implementation, when the base station device directly performs repeated transmission of the second control information according to the subframe and/or symbol for repeatedly transmitting the change notification, the terminal device may receive the second control information according to the determined subframe and/or symbol for receiving the change notification. In still another possible implementation, when the base station device repeatedly sends the second control information to the terminal device according to the correction offset (the correction offset may be included in the system information, terminal device may determine, according to the correction offset and the determined subframe and/or symbol in which the change notification needs to be received (or according to the correction offset, the start subframe number, and the determined subframe and/or symbol in which the change notification needs to be received), a subframe and/or symbol for receiving the second control information, and then receive the second control information according to the determined subframe and/or symbol for receiving the second control information.

In this embodiment of the present invention, preferably, to reduce a delay in obtaining the multicast service data by the terminal device, when the first control information changes, there is no need to perform step 403 and step 404, but the second control information is scrambled by using the first RNTI. The first RNTI is used to scramble the second control information, and is used to indicate that the first control information changes. For example, the first RNTI may be the SC-N-RNTI. Specifically, the base station device may scramble the first PDCCH (or the first MPDCCH) by using the first RNTI, for example, the SC-N-RNTI, and then send the first control information by using the first PDCCH (or the first MPDCCH) that is scrambled by using the first RNTI. When the first control information does not change, there is also no need to perform step 403 and step 404. In this case, the base station device may scramble the first PDCCH (or the first MPDCCH) by using a second RNTI, for example, an SC-RNTI, and then send the first control information by using the first PDCCH (or the first MPDCCH) that is scrambled by using the second RNTI. For the terminal device, the terminal device may descramble the first PDCCH (or the first MPDCCH) by using the first RNTI and the second RNTI separately. If the first PDCCH (or the first MPDCCH) is descrambled successfully by using the first RNTI, it indicates that the first control information changes. In this case, the first control information needs to be obtained again, so that the multicast service data is obtained again. If the first PDCCH (or the first MPDCCH) is descrambled successfully by using the second RNTI, it indicates that the first control information does not change. Alternatively, when the first control information changes, there is no need to perform step 403 and step 404, but indication information is added to the second control information, where the indication information is used to indicate that the first control information changes. In this way, when the first control information changes, there is no need to perform step 403 and step 404, and the change of the first control information may be directly notified to the terminal device by using the second control information. This reduces the delay in obtaining the multicast service data by the terminal device.

This step is optional.

407. The base station device sends first control information to the terminal device.

After the base station device sends the second control information to the terminal device, the base station device may send the first control information to the terminal device, where the first control information is control information of the multicast service data.

Further, to increase the success rate of receiving the multicast service data by the terminal device, the base station device may repeatedly send the first control information to the terminal device. In a possible implementation, all parameters used to control repeated transmission of the first control information are included in the second control information, that is, repeated transmission of the first control information is controlled by using the second control information. In this case, specifically, the base station device may send the first control information to the terminal device according to the second control information. The second control information may include a fourth configuration parameter used to control repeated transmission of the first control information. In addition, considering a limitation of the system bandwidth, the first control information may require segment transmission. Therefore, when the first control information does not require segment transmission, the fourth configuration parameter may include a fourth offset, a fourth scheduling period, a fourth start time, a fourth end time, a fourth repetition quantity, a fourth repetition pattern, an MCS, a TBS, and fourth frequency information; or when the first control information requires segment transmission, the fourth configuration parameter may further include a segment quantity and a repetition mode.

The fourth end time is a last frame position and/or a last subframe position and/or a last symbol position in a subframe, for repeatedly sending the first control information. In addition, in this specification, the MCS includes a modulation mode and a coding rate. Generally, the MCS uses index values to index different modulation modes and coding rates. The TBS, that is, a transport block size, may be in units of bits, or some values for indexing units of bits.

Figure 11:
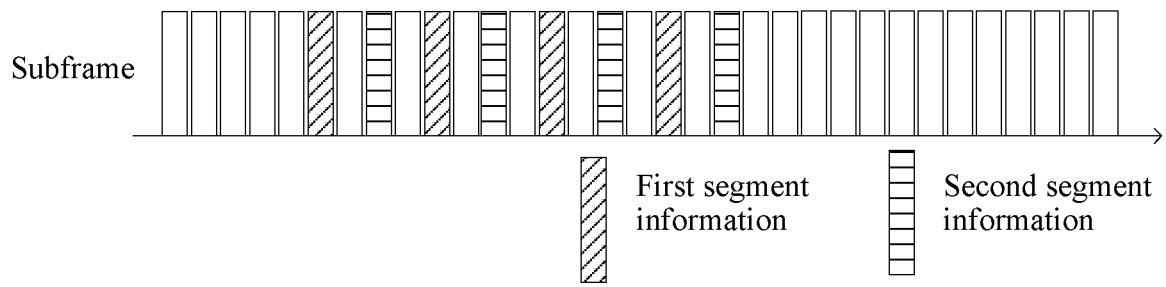
FIG. 11 is another simplified schematic diagram of data transmission according to an embodiment of the present invention.
Figure 12:
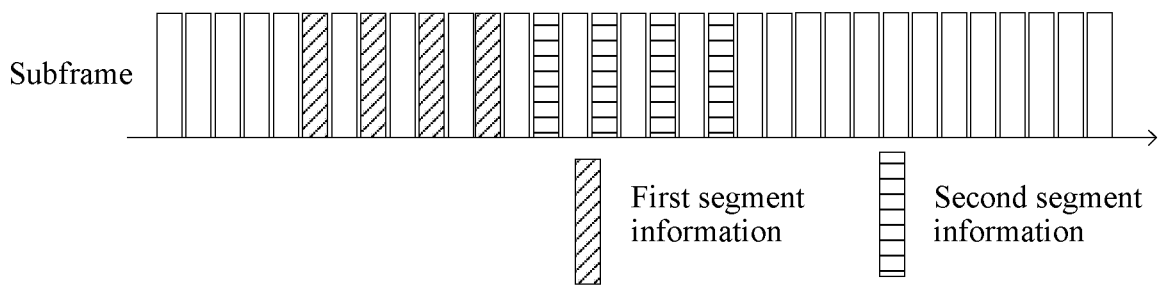
FIG. 12 is another simplified schematic diagram of data transmission according to an embodiment of the present invention.

The segment quantity is a quantity of segments obtained after the first control information is segmented, for example, 2 segments, . . . , or A segments, where A is an integer greater than or equal to 2. The repetition mode is alternately transmitting different segment information; or after repeated transmission of current segment information is complete, repeatedly transmitting next segment information. For example, FIG. 11 is a schematic diagram in which the segment quantity is 2, the repetition mode is alternately transmitting different segment information, the fourth repetition quantity is 4, and the fourth repetition pattern is transmitting segment information once every two subframes. FIG. 12 is a schematic diagram in which the segment quantity is 2, the repetition mode is repeatedly transmitting next segment information after repeated transmission of current segment information is complete, the fourth repetition quantity is 4, and the fourth repetition pattern is transmitting segment information once every two subframes.

Figure 13:
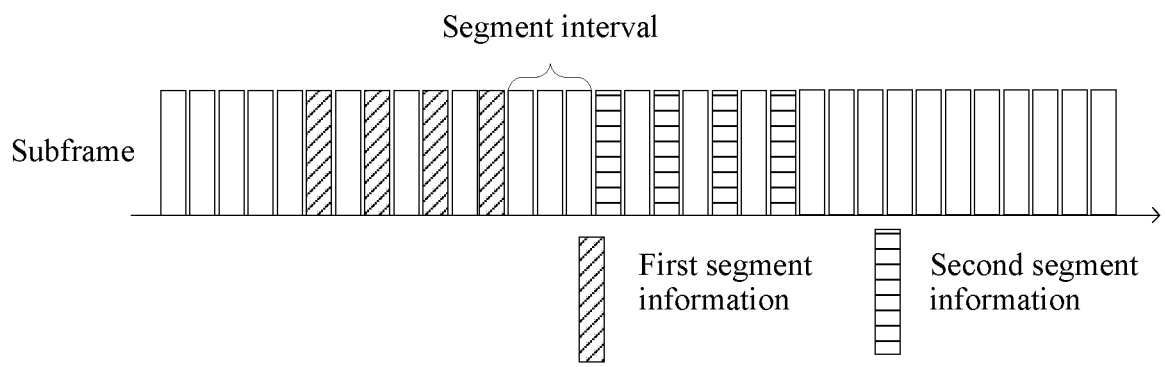
FIG. 13 is another simplified schematic diagram of data transmission according to an embodiment of the present invention.

In addition, further, the fourth configuration parameter may further include a segment interval. The segment interval is an interval for sending different segment information, for example, is one subframe, two subframes, . . . , or B subframes, where B is an integer greater than or equal to 1. For example, as shown in FIG. 13, the segment quantity is 2, the fourth repetition quantity is 4, the fourth repetition pattern is transmitting segment information once every two subframes, the repetition mode is repeatedly transmitting next segment information after repeated transmission of current segment information is complete, and the segment interval is three subframes. Alternatively, different repetition quantities may be configured for different segment information. Certainly, when the repetition quantity is replaced with a repetition time, different repetition times may also be configured for different segment information.

Figure 14:
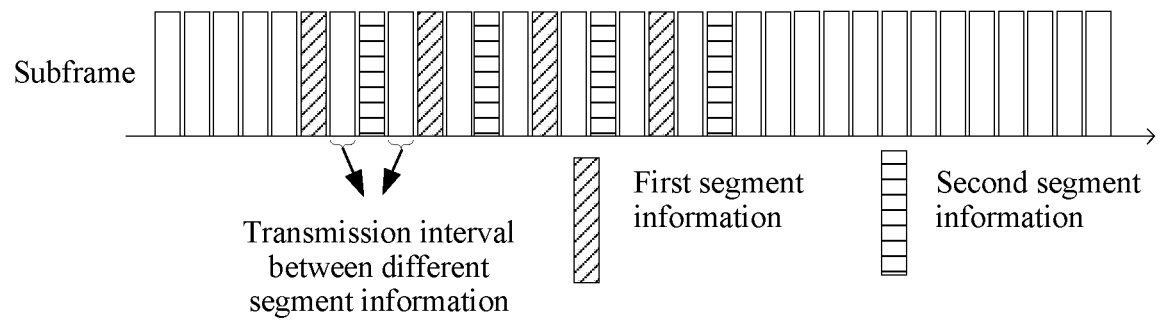
FIG. 14 is another simplified schematic diagram of data transmission according to an embodiment of the present invention.
Figure 15:
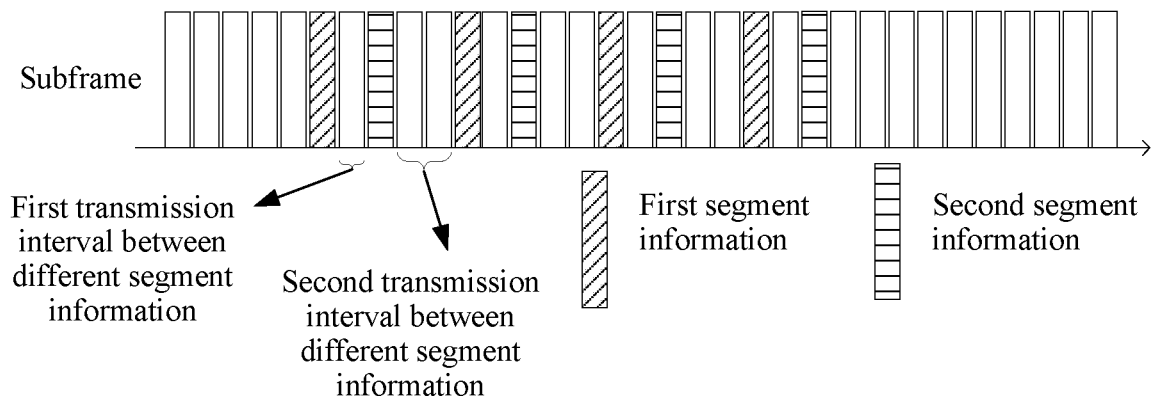
FIG. 15 is another simplified schematic diagram of data transmission according to an embodiment of the present invention.

When the repetition mode is alternately transmitting different segment information, further, the fourth repetition pattern parameter may be replaced with a transmission interval between different segment information. For example, as shown in FIG. 14, the segment quantity is 2, and a transmission interval between different segment information is one subframe. Alternatively, further, the fourth repetition pattern parameter may be replaced with a first transmission interval between different segment information and a second transmission interval between different segment information. For example, as shown in FIG. 15, the segment quantity is 2, the first transmission interval between different segment information is one subframe, and the second transmission interval between different segment information is four subframes.

It should be noted that, in this embodiment of the present invention, detailed descriptions about the fourth configuration parameter are similar to detailed descriptions about the second configuration parameter in step 403, and are not further provided herein in this embodiment of the present invention. In addition, content specifically included in the fourth configuration parameter may be selected according to a requirement in an actual application scenario. This is not specifically limited in this embodiment of the present invention. In addition, if a required parameter used to control repeated transmission of the first control information is not included in the fourth configuration parameter, the required parameter used to control repeated transmission of the first control information may be preconfigured in the base station device and the terminal device, or may be notified to the terminal device in another manner according to a requirement in an actual application scenario. This is not specifically limited in this embodiment of the present invention.

For example, assuming that the first control information does not require segmentation, the fourth configuration parameter includes the fourth offset, the fourth scheduling period (both the fourth scheduling period and the fourth offset are indicated by subframe numbers), the fourth start time, the fourth repetition quantity, the fourth repetition pattern, the MCS, the TBS, and the fourth frequency information. In this case, that the base station device sends the first control information to the terminal device according to the second control information may be specifically: the base station device may first determine, according to the fourth offset and the fourth scheduling period, whether the current system frame is a system frame in which the first control information needs to be sent; and if determining that the current system frame is not a system frame in which the first control information needs to be sent, the base station device determines whether the system frame next to the current system frame is a system frame in which the first control information needs to be sent; or if determining that the current system frame is a system frame in which the first control information needs to be sent, the base station device determines, according to the fourth offset, the fourth scheduling period, the fourth start time, the fourth repetition quantity, and the fourth repetition pattern, subframes and/or symbols in which the first control information needs to be sent in the current system frame or the current scheduling period, and then sends the first control information to the terminal device according to all the determined subframe numbers and/or symbols, the MCS, the TBS, and the fourth frequency information by using the SC-MCCH, to implement repeated sending of the first control information.

Assuming that the first control information requires segmentation, the fourth configuration parameter includes the fourth offset, the fourth scheduling period (both the fourth scheduling period and the fourth offset are indicated by subframe numbers), the fourth start time, the fourth repetition quantity, the fourth repetition pattern, the MCS, the TBS, the fourth frequency information, the segment quantity and the repetition mode. In this case, that the base station device sends the first control information to the terminal device according to the second control information may be specifically: the base station device may first determine, according to the fourth offset and the fourth scheduling period, whether the current system frame is a system frame in which segment information of the first control information needs to be sent; and if determining that the current system frame is not a system frame in which the segment information of the first control information needs to be sent, the base station device determines whether the system frame next to the current system frame is a system frame in which the segment information of the first control information needs to be sent; or if determining that the current system frame is a system frame in which the segment information of the first control information needs to be sent, the base station device determines, according to the fourth offset, the fourth scheduling period, the fourth start time, the fourth repetition quantity, the fourth repetition pattern, the segment quantity, and the repetition mode, subframes and/or symbols in which the segment information of the first control information needs to be sent in the current system frame or the current scheduling period, and then sends the segment information of the first control information to the terminal device according to all the determined subframe numbers and/or symbols, the MCS, the TBS, and the fourth frequency information by using the SC-MCCH, to implement repeated sending of the first control information. In addition, when the fourth configuration parameter does not include the segment quantity, the base station device may add, to a radio link control (RLC) protocol data unit (PDU) header of previous segment information, an indication used to indicate whether subsequent segment information exists.

In another possible implementation, to reduce the delay in obtaining the multicast service data by the terminal device, the base station device may include all parameters used to control repeated transmission of the first control information into the system information, and control repeated transmission of the first control information by using the system information. In other words, there is no need to perform step 405 and step 406 in this case. In this case, specifically, the base station device may send the first control information to the terminal device according to the system information. The system information may include the fourth configuration parameter used to control repeated transmission of the first control information. Detailed descriptions about the fourth configuration parameter are similar to the detailed descriptions about the fourth configuration parameter in the first possible implementation of this step, and are not further provided herein in this embodiment of the present invention. In addition, the specific process in which the base station device sends the first control information to the terminal device according to the system information is also similar to the process in which the base station device sends the first control information to the terminal device according to the second control information, and is also not further described in detail herein in this embodiment of the present invention. In this implementation, when a parameter used to control repeated transmission of the first control information and included in the system information changes, the base station device may send a paging message to the terminal device, to notify the terminal device that the parameter used to control repeated transmission of the first control information changes.

In still another possible implementation, some parameters used to control repeated transmission of the first control information may be included in the system information, and remaining parameters used to control repeated transmission of the first control information may be included in the second control information. In other words, the system information and the second control information are used together to control repeated transmission of the first control information. In this case, specifically, the base station device may send the first control information to the terminal device according to the system information and the second control information. In this possible implementation, which parameters used to control repeated transmission of the first control information are included in the system information, and which parameters are included in the second control information may be set according to a requirement in an actual application scenario. This is not limited in this embodiment of the present invention. In addition, detailed descriptions about the parameters used to control repeated transmission of the first control information and included in the system information and the second control information are similar to detailed descriptions about the fourth configuration parameter in the first possible implementation of this step, and are not further provided herein in this embodiment of the present invention. In addition, the specific process in which the base station device sends the first control information to the terminal device according to the system information and the second control information is similar to the process in which the base station device sends the first control information to the terminal device according to the second control information, and is also not further described in detail herein in this embodiment of the present invention.

408. The terminal device receives the first control information sent by the base station device.

After the base station device sends the first control information to the terminal device, the terminal device may receive the first control information sent by the base station device.

Further, in a possible implementation, when the base station device repeatedly sends the first control information to the terminal device according to the second control information, the terminal device may receive, according to the second control information, the first control information repeatedly sent by the base station device. Specifically, the terminal device may receive, according to the fourth configuration parameter included in the second control information, the first control information repeatedly sent by the base station device. Detailed descriptions about the fourth configuration parameter are similar to detailed descriptions about the fourth configuration parameter in step 407, and are not further provided herein in this embodiment of the present invention.

For example, according to the example in step 407, assuming that the first control information does not require segmentation, that the terminal device receives, according to the second control information, the first control information sent by the base station device may be specifically: the terminal device may first determine, according to the fourth offset and the fourth scheduling period, whether the current system frame is a system frame in which the first control information needs to be received; and if determining that the current system frame is not a system frame in which the first control information needs to be received, the terminal device determines whether the system frame next to the current system frame is a system frame in which the first control information needs to be received; or if determining that the current system frame is a system frame in which the first control information needs to be received, the terminal device determines, according to the fourth offset, the fourth scheduling period, the fourth start time, the fourth repetition quantity, and the fourth repetition pattern, subframes and/or symbols in which the first control information needs to be received in the current system frame or the current scheduling period, and then receives, according to all the determined subframe numbers and/or symbols, the MCS, the TBS, and the fourth frequency information by using the SC-MCCH, the first control information sent by the base station device. Because the first control information may be received repeatedly in a plurality of subframe numbers and/or symbols, a success rate of receiving the first control information by the terminal device is increased. Assuming that the first control information requires segmentation, that the terminal device receives, according to the second control information, the first control information sent by the base station device may be specifically: the terminal device may first determine, according to the fourth offset and the fourth scheduling period, whether the current system frame is a system frame in which the segment information of the first control information needs to be received; and if determining that the current system frame is not a system frame in which the segment information of the first control information needs to be received, the terminal device determines whether the system frame next to the current system frame is a system frame in which the segment information of the first control information needs to be received; or if determining that the current system frame is a system frame in which the segment information of the first control information needs to be received, the terminal device determines, according to the fourth offset, the fourth scheduling period, the fourth start time, the fourth repetition quantity, the fourth repetition pattern, the segment quantity, and the repetition mode, subframes and/or symbols in which the segment information of the first control information needs to be received in the current system frame or the current scheduling period, and then receives, according to all the determined subframe numbers and/or symbols, the MCS, the TBS, and the fourth frequency information by using the SC-MCCH, the segment information of the first control information sent by the base station device. Because the first control information may be received repeatedly in a plurality of subframe numbers and/or symbols, the success rate of receiving the first control information by the terminal device is increased.

In another possible implementation, when the base station device sends the first control information to the terminal device according to the system information, the terminal device may receive the first control information according to the system information. Specifically, the terminal device may receive, according to the fourth configuration parameter included in the system information, the first control information repeatedly sent by the base station device. Detailed descriptions about the fourth configuration parameter are similar to detailed descriptions about the fourth configuration parameter in step 407, and are not further provided herein in this embodiment of the present invention. In addition, the specific process in which the terminal device receives, according to the system information, the first control information sent by the base station device is also similar to the process in which the base station device receives, according to the second control information, the first control information sent by the base station device, and is also not further described in detail herein in this embodiment of the present invention. In this implementation, if the terminal device receives a paging message sent by the base station device, the terminal device may determine that the first control information changes. In this case, the terminal device needs to obtain the system information again, and further obtain the first control information and the multicast service data again.

In still another possible implementation, when the base station device repeatedly sends the first control information to the terminal device according to the system information and the second control information, the terminal device may receive the first control information according to the system information and the second control information. Specifically, the terminal device may receive, according to the fourth configuration parameters included in the system information and the second control information, the first control information repeatedly sent by the base station device. Detailed descriptions about the fourth configuration parameter are similar to detailed descriptions about the fourth configuration parameter in step 407, and are not further provided herein in this embodiment of the present invention. In addition, the specific process in which the base station device receives, according to the system information and the second control information, the first control information sent by the base station device is also similar to the process in which the base station device receives, according to the second control information, the first control information sent by the base station device, and is also not further described in detail herein in this embodiment of the present invention.

409. The base station device sends third control information to the terminal device.

Before sending the multicast service data to the terminal device, the base station device may first send, to the terminal device, scheduling information of the multicast service data, that is, third control information.

Further, to increase the success rate of receiving the multicast service data by the terminal device, the base station device may repeatedly send the third control information to the terminal device, and may control repeated transmission of the third control information by using the first control information. Specifically, when the first control information is used to control repeated transmission of the third control information, the base station device may send the third control information to the terminal device according to the first control information. The first control information may include a fifth configuration parameter used to control repeated transmission of the third control information. The fifth configuration parameter may include at least one of the following: a fifth offset, a fifth scheduling period, a fifth start time, a fifth end time, a fifth repetition quantity, a fifth repetition pattern, and fifth frequency information.

The fifth end time is a last frame position and/or a last subframe position and/or a last symbol position in a subframe, for repeatedly sending the third control information. In addition, the fifth offset may also be an offset used to indicate that a start time of the third control information is later than a start time or an end time of the first control information.

It should be noted that, in this embodiment of the present invention, detailed descriptions about the fifth configuration parameter are similar to descriptions about the second configuration parameter in step 403, and are not further provided herein in this embodiment of the present invention. In addition, content specifically included in the fifth configuration parameter may be selected according to a requirement in an actual application scenario. This is not specifically limited in this embodiment of the present invention. In addition, if a required parameter used to control repeated transmission of the third control information is not included in the fifth configuration parameter, the required parameter used to control repeated transmission of the third control information may be included in the system information and notified to the terminal device by using the system information to the terminal device, or may be notified to the terminal device in another manner according to a requirement in an actual application scenario. This is not specifically limited in this embodiment of the present invention.

For example, assuming that the fifth configuration parameter includes the fifth offset, the fifth scheduling period (both the fifth scheduling period and the fifth offset are indicated by subframe numbers), the fifth start time, the fifth repetition quantity, the fifth repetition pattern, and the fifth frequency information, that the base station device sends the third control information to the terminal device according to the first control information may be specifically: the base station device may first determine, according to the fifth offset and the fifth scheduling period, whether the current system frame is a system frame in which the third control information needs to be sent; and if determining that the current system frame is not a system frame in which the third control information needs to be sent, the base station device determines whether the system frame next to the current system frame is a system frame in which the third control information needs to be sent; or if determining that the current system frame is a system frame in which the third control information needs to be sent, the base station device determines, according to the fifth offset, the fifth scheduling period, the fifth start time, the fifth repetition quantity, and the fifth repetition pattern, subframes and/or symbols in which the third control information needs to be sent in the current system frame or the current scheduling period, and then sends the third control information to the terminal device according to all the determined subframe numbers and/or symbols, and the fifth frequency information by using a second PDCCH or a second MPDCCH, to implement repeated sending of the third control information.

410. The terminal device receives the third control information sent by the base station device.

After the base station device sends the third control information to the terminal device, the terminal device may receive the third control information sent by the base station device.

Further, when the base station device repeatedly sends the third control information to the terminal device according to the first control information, the terminal device may receive, according to the first control information, the third control information repeatedly sent by the base station device. Specifically, the terminal device may receive, according to the fifth configuration parameter included in the first control information, the third control information repeatedly sent by the base station device. Detailed descriptions about the fifth configuration parameter are similar to detailed descriptions about the fifth configuration parameter in step 409, and are not further provided herein in this embodiment of the present invention.

For example, according to the example in step 409, that the terminal device receives, according to the first control information, the third control information sent by the base station device may be specifically: the terminal device may first determine, according to the fifth offset and the fifth scheduling period, whether the current system frame is a system frame in which the third control information needs to be received; and if determining that the current system frame is not a system frame in which the third control information needs to be received, the terminal device determines whether the system frame next to the current system frame is a system frame in which the third control information needs to be received; or if determining that the current system frame is a system frame in which the third control information needs to be received, the terminal device determines, according to the fifth offset, the fifth scheduling period, the fifth start time, the fifth repetition quantity, and the fifth repetition pattern, subframes and/or symbols in which the third control information needs to be received in the current system frame or the current scheduling period, and then receives, according to all the determined subframe numbers and/or symbols, and the fifth frequency information by using the second PDCCH or the second MPDCCH, the third control information sent by the base station device. Because the third control information may be received repeatedly in a plurality of subframe numbers and/or symbols, a success rate of receiving the third control information by the terminal device is increased.

This step is optional.

411. The base station device sends the multicast service data to the terminal device.

After sending the third control information to the terminal device, the base station device may send the multicast service data to the terminal device.

Further, to increase the success rate of receiving the multicast service data by the terminal device, the base station device may repeatedly send the multicast service data to the terminal device. In a possible implementation, all parameters used to control repeated transmission of the multicast service data are included in the third control information, that is, repeated transmission of the multicast service data is controlled by using the third control information. In this case, specifically, the base station device may send the multicast service data to the terminal device according to the third control information. The third control information may include a first configuration parameter used to control repeated transmission of the multicast service data. The first configuration parameter may include at least one of the following: a first offset, a first repetition quantity, a first repetition pattern, an MCS, a TBS, and first frequency information. The first offset is an offset used to indicate that a start time of the multicast service data is later than a start time or an end time of the third control information, the start time is a start subframe number or a start system frame number, and the end time is an end subframe number or an end system frame number.

In addition, it should be noted that, in this embodiment of the present invention, detailed descriptions about the first configuration parameter are similar to descriptions about the second configuration parameter in step 403, and are not further provided herein in this embodiment of the present invention. In addition, content specifically included in the first configuration parameter may be selected according to a requirement in an actual application scenario. This is not specifically limited in this embodiment of the present invention. In addition, if a required parameter used to control repeated transmission of the multicast service data is not included in the first configuration parameter, the required parameter used to control repeated transmission of the multicast service data may be preconfigured in the base station device and the terminal device, or may be notified to the terminal device in another manner according to a requirement in an actual application scenario. This is not specifically limited in this embodiment of the present invention.

For example, the first configuration parameter includes the first offset, the first repetition quantity, the first repetition pattern, the MCS, the TBS, and the first frequency information. In this case, that the base station device sends the multicast service data to the terminal device according to the third control information may be specifically: the base station device may first determine, according to the first offset, whether the current system frame is a system frame in which the multicast service data needs to be sent; and if determining that the current system frame is a system frame in which the multicast service data needs to be sent, the base station device determines whether the system frame next to the current system frame is a system frame in which the multicast service data needs to be sent; or if determining that the current system frame is a system frame in which the multicast service data needs to be sent, the base station device determines, according to the start time or the end time of the third control information, the first offset, the first repetition quantity, and the first repetition pattern, subframes and/or symbols in which the multicast service data needs to be sent in the current system frame or the current scheduling period, and then sends the multicast service data to the terminal device according to all the determined subframe numbers and/or symbols, the MCS, the TBS, and the first frequency information by using the SC-MTCH, to implement repeated sending of the multicast service data.

In another possible implementation, to reduce the delay in obtaining the multicast service data by the terminal device, the base station device may include all parameters used to control repeated transmission of the multicast service data into the first control information, and control repeated transmission of the multicast service data by using the first control information. In other words, there is no need to perform step 409 and step 410 in this case. In this case, specifically, the base station device may send the multicast service data to the terminal device according to the first control information. The first control information may include a first configuration parameter used to control repeated transmission of the multicast service data. The first configuration parameter may include at least one of the following: a first offset, a first scheduling period, a first start time, a first end time, a first repetition quantity, a first repetition pattern, an MCS, a TBS, a session ID, a TMGI, and first frequency information, where the first end time is a last frame position and/or a last subframe position and/or a last symbol position in a subframe, for repeatedly sending the multicast service data. Detailed descriptions about the first configuration parameter are similar to detailed descriptions about the second configuration parameter in step 403, and are not further provided herein in this embodiment of the present invention. In addition, the specific process in which the base station device sends the multicast service data to the terminal device according to the first control information is also similar to the process in which the base station device sends the multicast service data to the terminal device according to the third control information, and is also not further described in detail herein in this embodiment of the present invention.

In still another possible implementation, some parameters used to control repeated transmission of the multicast service data may be included in the first control information, and remaining parameters used to control repeated transmission of the multicast service data may be included in the third control information. In other words, the first control information and the third control information are used together to control repeated transmission of the multicast service data. In this case, specifically, the base station device may send the multicast service data to the terminal device according to the first control information and the third control information. In this possible implementation, which parameters used to control repeated transmission of the multicast service data are included in the first control information, and which parameters are included in the third control information may be set according to a requirement in an actual application scenario. This is not limited in this embodiment of the present invention. In addition, detailed descriptions about the parameters used to control repeated transmission of the multicast service data and included in the first control information and the third control information are similar to detailed descriptions about the first configuration parameter in the second possible implementation of this step, and are not further provided herein in this embodiment of the present invention. In addition, the specific process in which the base station device sends the multicast service data to the terminal device according to the first control information and the third control information is similar to the process in which the base station device sends the multicast service data to the terminal device according to the third control information, and is also not further described in detail herein in this embodiment of the present invention.

412. The terminal device receives the multicast service data sent by the base station device.

After the base station device sends the multicast service data to the terminal device, the terminal device may receive the multicast service data sent by the base station device.

Further, in a possible implementation, when the base station device repeatedly sends the multicast service data to the terminal device according to the third control information, the terminal device may receive, according to the third control information, the multicast service data repeatedly sent by the base station device. Specifically, the terminal device may receive, according to the first configuration parameter included in the third control information, the multicast service data repeatedly sent by the base station device. Detailed descriptions about the first configuration parameter are similar to detailed descriptions about the first configuration parameter in step 411, and are not further provided herein in this embodiment of the present invention.

For example, according to the example in step 411, that the terminal device receives, according to the third control information, the multicast service data sent by the base station device may be specifically: the terminal device may first determine, according to the first offset, whether the current system frame is a system frame in which the multicast service data needs to be received; and if determining that the current system frame is not a system frame in which the multicast service data needs to be received, the terminal device determines whether the system frame next to the current system frame is a system frame in which the multicast service data needs to be received; or if determining that the current system frame is a system frame in which the multicast service data needs to be received, the terminal device determines, according to the start time or the end time of the third control information, the first offset, the first repetition quantity, and the first repetition pattern, subframes and/or symbols in which the multicast service data needs to be received in the current system frame or the current scheduling period, and then receives, according to all the determined subframe numbers and/or symbols, the MCS, the TBS, and the first frequency information by using the SC-MTCH, the multicast service data sent by the base station device. Because the multicast service data may be repeatedly received in a plurality of subframe numbers and/or symbols, the success rate of receiving the multicast service data by the terminal device is increased.

In another possible implementation, when the base station device sends the multicast service data to the terminal device according to the first control information, the terminal device may receive the multicast service data according to the first control information. Specifically, the terminal device may receive, according to the first configuration parameter included in the first control information, the multicast service data repeatedly sent by the base station device. Detailed descriptions about the first configuration parameter are similar to detailed descriptions about the first configuration parameter in step 411, and are not further provided herein in this embodiment of the present invention.

In addition, the specific process in which the base station device receives, according to the first control information, the multicast service data sent by the base station device is also similar to the process in which the base station device receives, according to the third control information, the multicast service data sent by the base station device, and is also not further described in detail herein in this embodiment of the present invention.

In still another possible implementation, when the base station device repeatedly sends the multicast service data to the terminal device according to the first control information and the third control information, the terminal device may receive the multicast service data according to the first control information and the third control information. Specifically, the terminal device may receive, according to the first configuration parameters included in the first control information and the third control information, the multicast service data repeatedly sent by the base station device. Detailed descriptions about the first configuration parameter are similar to detailed descriptions about the first configuration parameter in step 411, and are not further provided herein in this embodiment of the present invention. In addition, the specific process in which the base station device receives, according to the first control information and the third control information, the multicast service data sent by the base station device is also similar to the process in which the base station device receives, according to the third control information, the multicast service data sent by the base station device, and is also not further described in detail herein in this embodiment of the present invention.

In the data transmission method provided by the present invention, the base station device sends, to the terminal device, the first control information used to control repeated transmission of the multicast service data, and repeatedly sends the multicast service data to the terminal device according to the first control information, so that the terminal device can receive, according to the received first control information, the multicast service data repeatedly sent by the base station device. Therefore, the success rate of receiving the multicast service data by the terminal device is increased. Therefore, in MTC in which an SC-PTM technology is introduced, an MTC terminal can receive, according to received first control information, multicast service data repeatedly sent by a base station, and a success rate of receiving data by the MTC terminal is increased.

In addition, a success rate of receiving the multicast service data by the MTC terminal is further increased by repeated transmission of the first control information, the second control information, the third control information, and the change notification. In addition, the parameters used to control repeated transmission of the first control information are carried in the system information for transmission and/or the parameters used to control repeated transmission of the multicast service data are carried in the first control information. This reduces the delay in obtaining the multicast service data by the terminal device. In addition, when the first control information changes, the second control information carries the first RNTI used to indicate that the first control information changes, or the second control information is used to indicate that the first control information changes, and no change notification is sent to the terminal device. This reduces the delay in obtaining the multicast service data by the terminal device.

The solutions provided by the embodiments of the present invention are described above mainly from a perspective of interaction between network elements. It may be understood that, to implement the foregoing functions, each network element, for example, the base station device or the terminal device, may include a corresponding hardware structure and/or software module for performing each function. A person skilled in the art should be easily aware that, with reference to method steps in the examples described in the embodiments disclosed in this specification, the present invention can be implemented by hardware, or a combination of hardware and computer software. Whether a function is performed by hardware or hardware driven by computer software depends on particular applications and design constraints of the technical solutions. A person skilled in the art may use different methods to implement the described functions for each particular application, but it should not be considered that this implementation goes beyond the scope of the present invention.

In the embodiments of the present invention, functional modules may be defined for the base station device and the terminal device according to the foregoing methods. For example, each functional module may be defined in a correspondence to each function, or two or more functions may be integrated into one processing module. The integrated module may be implemented in a form of hardware, or may be implemented in a form of a software functional module. It should be noted that, division of modules is merely an example in the embodiments of the present invention, and is merely division of logical functions. Another division manner may exist in an actual implementation.

Figure 16:
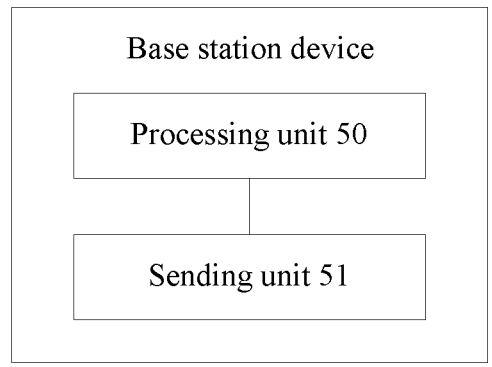
FIG. 16 is a schematic structural diagram of a base station device according to an embodiment of the present invention.

When each functional module is defined in a correspondence to each function, FIG. 16 shows a possible schematic structural diagram of the base station device used in the foregoing embodiment. As shown in FIG. 16, the base station device may include a processing unit 50 and a sending unit 51.

The processing unit 50 is configured to determine first control information used to control repeated transmission of multicast service data.

The sending unit 51 is configured to support the base station device in performing step 201 and step 202 in the data transmission method shown in FIG. 3, and step 401, step 403, step 405, step 407, step 409, and step 411 in the data transmission method shown in FIG. 5.

It should be noted that, for all content about each step in the foregoing method embodiment, reference may be made to function descriptions of corresponding functional modules. Details are not further described herein.

The base station device provided by this embodiment of the present invention is configured to perform the foregoing data transmission method, and therefore can achieve a same effect as the foregoing data transmission method.

Figure 17:
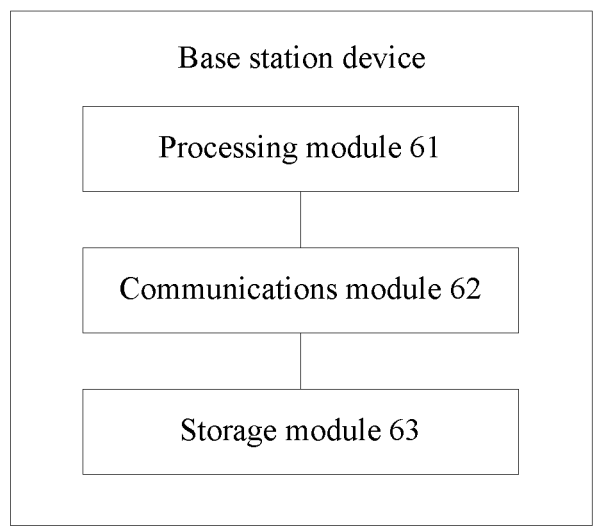
FIG. 17 is a schematic structural diagram of another base station device according to an embodiment of the present invention.

When an integrated unit is used, FIG. 17 shows another possible schematic structural diagram of the base station device used in the foregoing embodiment. As shown in FIG. 17, the base station device includes a processing module 61 and a communications module 62.

The processing module 61 is configured to control and manage actions of the base station device, and/or is used in other processes of the technology described in this specification. The communications module 62 is configured to support communication between the base station device and other network entities, for example, communication with functional modules or network entities shown in FIG. 2, FIG. 18, or FIG. 19. Specifically, for example, the communications module 62 is configured to perform step 201 and step 202 in the data transmission method shown in FIG. 3, and step 401, step 403, step 405, step 407, step 409, and step 411 in the data transmission method shown in FIG. 5. The base station device may further include a storage module 63, configured to store program code and data of the base station device.

The processing module 61 may be a processor or a controller. The processing module may implement or perform various illustrative logical blocks, modules, and circuits described in the disclosure of the present invention. The processor may also be a combination implementing a computing function, for example, a combination including one or more microprocessors, a combination of a DSP and a microprocessor, or the like. The communications module 62 may be a transceiver, a transceiver circuit, a communications interface, or the like. The storage module 63 may be a memory.

Figure 20:
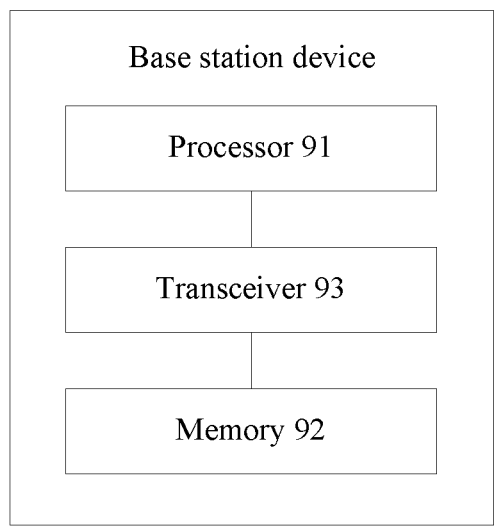
FIG. 20 is a schematic structural diagram of another base station device according to an embodiment of the present invention.

When the processing module 61 is a processor, the communications module 62 is a transceiver, and the storage module 63 is a memory, the base station device used in this embodiment of the present invention may be a base station device shown in FIG. 20.

Figure 18:
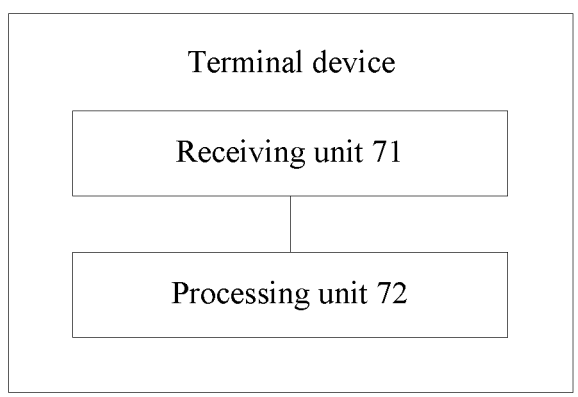
FIG. 18 is a schematic structural diagram of a terminal device according to an embodiment of the present invention.

When each functional module is defined in a correspondence to each function, FIG. 18 is a possible schematic structural diagram of the terminal device used in the foregoing embodiment. As shown in FIG. 18, the terminal device may include a receiving unit 71 and a processing unit 72.

The receiving unit 71 is configured to support the terminal device in performing step 301 and step 302 in the data transmission method shown in FIG. 4, and step 402, step 404, step 406, step 408, step 410, and step 412 in the data transmission method shown in FIG. 5.

The processing unit 72 is configured to determine a repetition transmission parameter according to first control information received by the receiving unit 71, so that the receiving unit 71 may receive multicast service data according to the determined repetition transmission parameter for the multicast service data.

It should be noted that, for all content about each step in the foregoing method embodiment, reference may be made to function descriptions of corresponding functional modules. Details are not further described herein.

The terminal device provided by this embodiment of the present invention is configured to perform the foregoing data transmission method, and therefore can achieve a same effect as the foregoing data transmission method.

Figure 19:
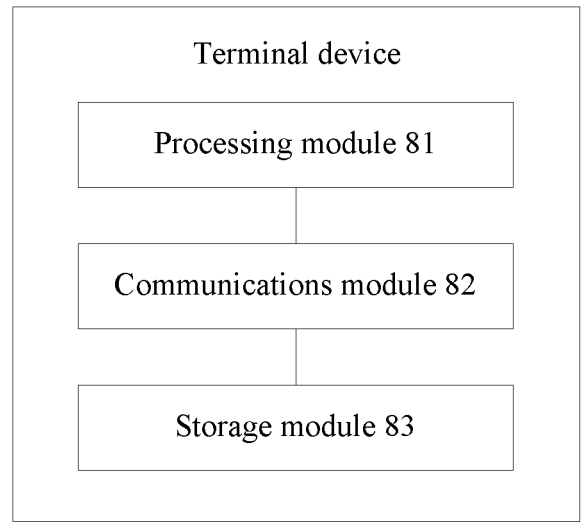
FIG. 19 is a schematic structural diagram of another terminal device according to an embodiment of the present invention.

When an integrated unit is used, FIG. 19 shows another possible schematic structural diagram of the terminal device used in the foregoing embodiment. As shown in FIG. 19, the terminal device includes a processing module 81 and a communications module 82.

The processing module 81 is configured to control and manage actions of the terminal device, and/or is used in other processes of the technology described in this specification. The communications module 82 is configured to support communication between the terminal device and other network entities, for example, communication with functional modules or network entities shown in FIG. 2, FIG. 16, or FIG. 17. Specifically, for example, the communications module 82 is configured to perform step 301 and step 302 in the data transmission method shown in FIG. 4, and step 402, step 404, step 406, step 408, step 410, and step 412 in the data transmission method shown in FIG. 5. The terminal device may further include a storage module 83, configured to store program code and data of the terminal device.

The processing module 81 may be a processor or a controller. The processing module may implement or perform various illustrative logical blocks, modules, and circuits described in the disclosure of the present invention. The processor may also be a combination implementing a computing function, for example, a combination including one or more microprocessors, a combination of a DSP and a microprocessor, or the like. The communications module 82 may be a transceiver, a transceiver circuit, a communications interface, or the like. The storage module 83 may be a memory.

Figure 21:
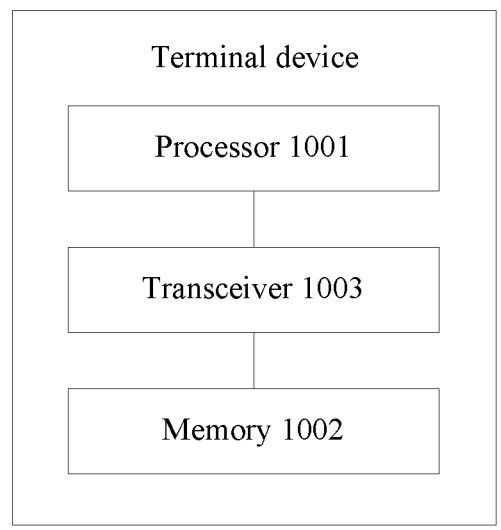
FIG. 21 is a schematic structural diagram of another terminal device according to an embodiment of the present invention.

When the processing module 81 is a processor, the communications module 82 is a transceiver, and the storage module 83 is a memory, the terminal device used in this embodiment of the present invention may be a terminal device shown in FIG. 21.

FIG. 20 is a schematic structural diagram of another base station device according to an embodiment of the present invention. As shown in FIG. 20, the base station device may include a processor 91, a memory 92, and a transceiver 93.

The memory 92 is configured to store a computer-executable instruction, and when the base station device runs, the processor 91 executes the computer-executable instruction stored in the memory 92, so that the base station device performs the data transmission method shown in FIG. 3 or FIG. 5. In addition, when the base station device runs, the transceiver 93 is configured to perform the data transmission method shown in FIG. 3 or FIG. 5, to correspondingly implement the function of the sending unit 51 included in the base station device shown in FIG. 16.

For example, the transceiver 93 performs step 201 in the data transmission method shown in FIG. 3, to implement the function of the sending unit 51 included in the base station device shown in FIG. 16. For another example, the transceiver 93 performs step 409 in the data transmission method shown in FIG. 5, to implement the function of the sending unit 51 included in the base station device shown in FIG. 16. In this embodiment of the present invention, the transceiver 93 may include a part or an entirety of a baseband processor, or may further optionally include an RF processor. The RF processor is configured to receive or transmit an RF signal. The baseband processor is configured to implement processing of a baseband signal converted from an RF signal or a baseband signal to be converted into an RF signal.

This embodiment further provides a storage medium, where the storage medium may include the memory 92.

The processor 91 may be a central processing unit (CPU). The processor 91 may also be a general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor may be any conventional processor or the like. In this embodiment of the present invention, the processor 91 may detect that upper-layer software run by the processor 91 such as application software needs to initiate a data communication service, and trigger the method mentioned above in this embodiment.

The memory 92 may include a volatile memory, for example, a random access memory (RAM). The memory 92 may also include a non-volatile memory, for example, a read-only memory (ROM), a flash memory (flash memory), a hard disk drive (HDD), or a solid-state drive (SSD). The memory 92 may further include a combination of the foregoing types of memories.

The transceiver 93 may be specifically a radio transceiver. For example, the radio transceiver may include a radio frequency front-end module or an antenna, or the like in addition to an RF booster and a baseband processor. The processor 91 performs data reception and transmission with another device such as another terminal device by using the transceiver 93.

It should be noted that, for a specific work process of each functional module in the base station device provided by this embodiment of the present invention, reference may be made to the detailed description of the corresponding process in the method embodiment. Details are not further described herein in this embodiment of the present invention.

The base station device provided by this embodiment of the present invention is configured to perform the foregoing data transmission method, and therefore can achieve a same effect as the foregoing data transmission method.

FIG. 21 is a schematic structural diagram of another terminal device according to an embodiment of the present invention. As shown in FIG. 21, the terminal device may include a processor 1001, a memory 1002, and a transceiver 1003.

The memory 1002 is configured to store a computer-executable instruction, and when the terminal device runs, the processor 1001 executes the computer-executable instruction stored in the memory 1002, so that the terminal device performs the data transmission method shown in FIG. 4 or FIG. 5. In addition, when the terminal device runs, the transceiver 1003 is configured to perform the data transmission method shown in FIG. 4 or FIG. 5, to correspondingly implement the function of the receiving unit 71 included in the terminal device shown in FIG. 18.

For example, the transceiver 1003 performs step 301 in the data transmission method shown in FIG. 4, to implement the function of the receiving unit 71 included in the terminal device shown in FIG. 18. For another example, the transceiver 1003 performs step 406 in the data transmission method shown in FIG. 5, to implement the function of the receiving unit 71 included in the terminal device shown in FIG. 18. In this embodiment of the present invention, the transceiver 1003 may include a part or an entirety of a baseband processor, or may further optionally include an RF processor. The RF processor is configured to receive or transmit an RF signal. The baseband processor is configured to implement processing of a baseband signal converted from an RF signal or a baseband signal to be converted into an RF signal.

This embodiment further provides a storage medium, where the storage medium may include the memory 1002.

The processor 1001 may be a CPU. The processor 1001 may also be a general-purpose processor, a DSP, an ASIC, an FPGA or another programmable logic device, a discrete gate or transistor logic device, a discrete hardware component, or the like. The general purpose processor may be a microprocessor, or the processor may be any conventional processor or the like. In this embodiment of the present invention, the processor 1001 may detect that upper-layer software run by the processor 1001 such as application software needs to initiate a data communication service, and trigger the method mentioned above in this embodiment.

The memory 1002 may be a volatile memory, for example, a RAM. The memory 1002 may also include a non-volatile memory, for example, a ROM, a flash memory, an HDD, or an SSD. The memory 1002 may further include a combination of the foregoing types of memories.

The transceiver 1003 may be specifically a radio transceiver. For example, the radio transceiver may include a radio frequency front-end component or an antenna, or the like in addition to an RF booster and a baseband processor.

The processor 1001 performs data reception and transmission with another device such as a base station device by using the transceiver 1003.

It should be noted that, for a specific work process of each functional module in the terminal device provided by this embodiment of the present invention, reference may be made to the detailed description of the corresponding process in the method embodiment. Details are not further described herein in this embodiment of the present invention.

The terminal device provided by this embodiment of the present invention is configured to perform the foregoing data transmission method, and therefore can achieve a same effect as the foregoing data transmission method.

The foregoing descriptions about implementations allow a person skilled in the art to understand that, for the purpose of convenient and brief description, division of the foregoing functional modules is taken as an example for illustration. In an actual application, the foregoing functions can be allocated to different modules and implemented according to a requirement, that is, an inner structure of an apparatus is divided into different functional modules to implement all or part of the functions described above.

When a method provided by the embodiments of the present invention is implemented in the form of a software functional unit and sold or used as an independent product, the method may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of the present invention. The foregoing storage medium includes: any medium that can store program code, such as a USB flash drive, a removable hard disk, a ROM, a RAM, a magnetic disk, or optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   sending, by a base station, a system information of a first physical downlink control channel (PDCCH), the system information comprising a third repetition quantity for the first PDCCH, the system information being a portion of control information used to control repeated transmission of multicast service data;
   sending, by the base station on the first PDCCH, a second control information for a third repetition quantity times, the second control information comprising a fourth repetition quantity for a single cell multicast control channel (SC-MCCH);
   sending, by the base station on the SC-MCCH, a first control information for a fourth repetition quantity times, the first control information comprising a fifth repetition quantity for a second PDCCH;

sending, by the base station on the second PDCCH, a third control information for a fifth repetition quantity times, the third control information comprising a first repetition quantity for a single cell multicast traffic channel (SC-MTCH); and sending, by the base station on the SC-MTCH, the multicast service data for a first repetition quantity times.

2. The method according to claim 1, wherein the method further comprises:

sending, by the base station on the first PDCCH or on the second PDCCH, a first notification, the first notification indicating a change of the SC-MCCH, wherein the first PDCCH or the second PDCCH is scrambled by a first radio network temporary identifier (RNTI).

3. The method according to claim 2, wherein the sending, by the base station, the first notification comprises:

sending, by the base station, the first notification when determining a start of a new type of multicast service data.

4. The method according to claim 1, the method further comprising:

sending, by the base station on the first PDCCH, a second notification, the second notification indicating a change of the SC-MCCH.

5. The method according to claim 1, wherein the second control information further comprises at least one of: a first offset, a first scheduling period, a session identity (ID), a temporary mobile group identity (TMGI), a modulation and coding scheme (MCS), or a first frequency information;

the first offset and the first scheduling period are used to determine a system frame number and a start subframe number of the multicast service data or the second PDCCH; and the first frequency information is used to indicate a frequency for transmitting the multicast service data or sending the second PDCCH, and the first frequency information comprising at least one of: a narrow band center frequency or a narrow band index value.

6. The method according to claim 1, wherein the first control information further comprises at least one of: a second offset, a second scheduling period, or a second frequency information;

the second offset and the second scheduling period are used to determine a system frame number and a start subframe number for transmitting the SC-MCCH; and the second frequency information is used to indicate a frequency for sending the second control information, and the second frequency information comprising at least one of: a narrow band center frequency or a narrow band index value.

7. A communication apparatus, comprising:

a memory storing a first repetition quantity, a second repetition quantity, a third repetition quantity, a fourth repetition quantity, and a fifth repetition quantity; and a transmitter in communication with the memory, the transmitter configured to:

send a system information of a first physical downlink control channel (PDCCH), the system information comprising the third repetition quantity for the first PDCCH, the system information being a portion of control information used to control repeated transmission of multicast service data;

send on the first PDCCH, a second control information for a third repetition quantity times, the second control information comprising the fourth repetition quantity for a single cell multicast control channel (SC-MCCH);

send on the SC-MCCH, a first control information for the fourth repetition quantity times, the first control information comprising the fifth repetition quantity for a second PDCCH;

send on the second PDCCH, a third control information for a fifth repetition quantity times, the third control information comprising the first repetition quantity for a single cell multicast traffic channel (SC-MTCH); and send on the SC-MTCH the multicast service data for a first repetition quantity times.

8. The apparatus according to claim 7, wherein the transmitter is further configured to send a first notification through the first PDCCH or the second PDCCH, the first notification indicating a change of the SC-MCCH, wherein the first PDCCH or the second PDCCH is scrambled by a first radio network temporary identifier (RNTI).

9. The apparatus according to claim 8, wherein the transmitter is configured to:

send the first notification when determining a start of a new type of multicast service data.

10. The apparatus according to claim 7, wherein the transmitter is further configured to send a second notification through the first PDCCH, the second notification indicating a change of the SC-MCCH.

11. The apparatus according to claim 7, wherein the second control information further comprises at least one of: a first offset, a first scheduling period, a session identity (ID), a temporary mobile group identity (TMGI), a modulation and coding scheme (MCS), or a first frequency information;

the first offset and the first scheduling period are used to determine a system frame number and a start subframe number of the multicast service data or the second PDCCH; and the first frequency information is used to indicate a frequency for transmitting the multicast service data or sending the second PDCCH, and the first frequency information comprising at least one of: a narrow band center frequency or a narrow band index value.

12. The apparatus according to claim 7, wherein the first control information further comprises at least one of: a second offset, a second scheduling period, or a second frequency information;

the second offset and the second scheduling period are used to determine a system frame number and a start subframe number for transmitting the SC-MCCH; and the second frequency information is used to indicate a frequency for sending the second control information, and the second frequency information comprising at least one of: a narrow band center frequency or a narrow band index value.

13. A non-transitory computer-readable medium storing computer instructions for a base station, that when executed by one or more processors, cause the one or more processors to perform the steps of:

sending a system information of a first physical downlink control channel (PDCCH), the system information comprising a third repetition quantity for the first PDCCH, the system information being a portion of control information used to control repeated transmission of multicast service data;

sending on the first PDCCH, a second control information for a third repetition quantity times, the second control information comprising a fourth repetition quantity for a single cell multicast control channel (SC-MCCH);

sending on the SC-MCCH, the first control information for a fourth repetition quantity times, the first control information comprising a fifth repetition quantity for a second PDCCH;

sending on the second PDCCH, a third control information for a fifth repetition quantity times, the third control information comprising a first repetition quantity for a single cell multicast traffic channel (SC-MTCH); and sending on the SC-MTCH the multicast service data for a first repetition quantity times.

14. The non-transitory computer-readable medium according to claim 13, the one or more processors further executing the computer instructions to:

send a first notification through the first PDCCH or the second PDCCH, the first notification indicating a change of the SC-MCCH, wherein the first PDCCH or the second PDCCH is scrambled by a first radio network temporary identifier (RNTI).

15. The non-transitory computer-readable medium according to claim 14, the one or more processors further executing the computer instructions to:

send the first notification when determining a start of a new type of multicast service data.

16. The non-transitory computer-readable medium according to claim 13, the one or more processors further executing the computer instructions to:

send a second notification through the first PDCCH, the second notification indicating a change of the SC-MCCH.

17. The non-transitory computer-readable medium according to claim 13, the second control information further comprising at least one of: a first offset, a first scheduling period, a session identity (ID), a temporary mobile group identity (TMGI), a modulation and coding scheme (MCS), or a first frequency information;

the first offset and the first scheduling period are used to determine a system frame number and a start subframe number of the multicast service data or the second PDCCH; and the first frequency information is used to indicate a frequency for transmitting the multicast service data or sending the second PDCCH, and the first frequency information comprising at least one of: a narrow band center frequency or a narrow band index value.

18. The non-transitory computer-readable medium according to claim 13, the first control information further comprising at least one of: a second offset, a second scheduling period, or a second frequency information;

the second offset and the second scheduling period are used to determine a system frame number and a start subframe number for transmitting the SC-MCCH; and the second frequency information is used to indicate a frequency for sending the second control information, and the second frequency information comprising at least one of the following: a narrow band center frequency or a narrow band index value.

* * * * *